United States Patent
Jensen et al.

(10) Patent No.: US 9,174,732 B2
(45) Date of Patent: *Nov. 3, 2015

(54) METHODS AND SYSTEMS FOR TRANSITIONING AN AERIAL VEHICLE BETWEEN CROSSWIND FLIGHT AND HOVER FLIGHT

(71) Applicant: Google Inc., Mountain View, CA (US)

(72) Inventors: Kenneth Jensen, Berkeley, CA (US); Erik Christopher Chubb, San Francisco, CA (US); Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/144,146

(22) Filed: Dec. 30, 2013

(65) Prior Publication Data

US 2015/0183512 A1    Jul. 2, 2015

(51) Int. Cl.
*B64C 39/02*      (2006.01)
*F03D 5/00*       (2006.01)
*G05D 1/10*       (2006.01)

(52) U.S. Cl.
CPC ............ *B64C 39/022* (2013.01); *F03D 5/00* (2013.01); *G05D 1/101* (2013.01); *B64C 2201/021* (2013.01); *B64C 2201/148* (2013.01); *F05B 2240/921* (2013.01)

(58) Field of Classification Search
CPC .... B64C 31/06; B64C 39/022; B64C 39/024; B64C 2201/024; B64C 2201/08; B64C 2201/148; B64F 1/04; B64F 1/12; B64F 1/125; A63H 27/04; F03D 5/00; F03D 9/002
See application file for complete search history.

(56) References Cited

U.S. PATENT DOCUMENTS 2,453,857 A * 11/1948 Platt et al. ................. 244/17.17
2,528,268 A * 10/1950 Dickinson ...................... 446/30

(Continued)

FOREIGN PATENT DOCUMENTS

| WO | WO2010/135604 | 11/2010 |
| WO | WO2011/119876 | 9/2011 |
| WO | WO2013/049732 | 4/2013 |

OTHER PUBLICATIONS

Horn et al., "Numerical Trajectory Optimization for Airborne Wind Energy Systems Described by High Fidelity Aircraft Models", http://homes.esat.kuleuven.be/~highwind/wp-content/uploads/2013/08/Horn2013.pdf., 2013.

(Continued)

*Primary Examiner* — Joseph W Sanderson
(74) *Attorney, Agent, or Firm* — McDonnell Boehnen Hulbert & Berghoff LLP

(57) ABSTRACT

A method involves operating an aerial vehicle to travel along a first closed path on a tether sphere while oriented in a crosswind-flight orientation. A tether is connected to the aerial vehicle on a first end and is connected to a ground station on a second end. Further, the tether sphere has a radius corresponding to a length of the tether. The method further involves while the aerial vehicle is in the crosswind-flight orientation, operating the aerial vehicle to travel along a second closed path on the tether sphere, such that a speed of the aerial vehicle is reduced. And the method involves after or while the speed of the aerial vehicle is reduced, transitioning the aerial vehicle from traveling along the second closed path while in the crosswind-flight orientation to a hover-flight orientation.

21 Claims, 14 Drawing Sheets

(56) References Cited

U.S. PATENT DOCUMENTS

| | | | | |
|---|---|---|---|---|
| 3,383,791 | A * | 5/1968 | De Vos | 446/32 |
| 3,987,987 | A * | 10/1976 | Payne et al. | 244/153 R |
| 4,161,843 | A * | 7/1979 | Hui | 446/37 |
| 4,251,040 | A * | 2/1981 | Loyd | 244/154 |
| 4,377,051 | A * | 3/1983 | Dulake | 446/31 |
| 4,981,456 | A * | 1/1991 | Sato et al. | 446/36 |
| 6,254,034 | B1 * | 7/2001 | Carpenter | 244/153 R |
| 6,523,781 | B2 * | 2/2003 | Ragner | 244/153 R |
| 6,572,482 | B1 * | 6/2003 | Lewis, Jr. | 472/9 |
| 7,188,808 | B1 | 3/2007 | Olson | |
| 7,317,261 | B2 * | 1/2008 | Rolt | 290/55 |
| 8,028,952 | B2 * | 10/2011 | Urnes, Sr. | 244/63 |
| 8,350,403 | B2 * | 1/2013 | Carroll | 290/55 |
| 8,434,710 | B2 | 5/2013 | Hothi et al. | |
| 8,800,931 | B2 * | 8/2014 | Vander Lind | 244/154 |
| 8,888,049 | B2 * | 11/2014 | Vander Lind | 244/153 R |
| 8,922,046 | B2 * | 12/2014 | Vander Lind | 290/55 |
| 2002/0109045 | A1 | 8/2002 | Beach et al. | |
| 2007/0176432 | A1 * | 8/2007 | Rolt | 290/55 |
| 2008/0087762 | A1 | 4/2008 | Holloman | |
| 2009/0185904 | A1 * | 7/2009 | Landberg | 416/131 |
| 2010/0013236 | A1 * | 1/2010 | Carroll | 290/55 |
| 2010/0026007 | A1 | 2/2010 | Bevirt | |
| 2010/0032947 | A1 | 2/2010 | Bevirt | |
| 2010/0032948 | A1 | 2/2010 | Bevirt | |
| 2010/0221112 | A1 | 9/2010 | Bevirt et al. | |
| 2010/0230546 | A1 | 9/2010 | Bevirt et al. | |
| 2010/0283253 | A1 | 11/2010 | Bevirt | |
| 2010/0295303 | A1 * | 11/2010 | Lind et al. | 290/44 |
| 2010/0295320 | A1 | 11/2010 | Bevirt | |
| 2010/0295321 | A1 | 11/2010 | Bevirt | |
| 2011/0042508 | A1 | 2/2011 | Bevirt et al. | |
| 2011/0042509 | A1 | 2/2011 | Bevirt et al. | |
| 2011/0042510 | A1 | 2/2011 | Bevirt et al. | |
| 2011/0121570 | A1 | 5/2011 | Bevirt et al. | |
| 2011/0127775 | A1 | 6/2011 | Bevirt | |
| 2011/0233325 | A1 | 9/2011 | Kramer | |
| 2011/0260462 | A1 * | 10/2011 | Vander Lind | 290/55 |
| 2011/0266395 | A1 | 11/2011 | Bevirt | |
| 2012/0104763 | A1 * | 5/2012 | Lind | 290/55 |
| 2012/0287274 | A1 | 11/2012 | Bevirt | |
| 2013/0084766 | A1 * | 4/2013 | Perdomo | 446/57 |
| 2013/0130586 | A1 * | 5/2013 | Orestes | 446/33 |
| 2013/0134261 | A1 * | 5/2013 | Goldstein | 244/155 A |
| 2013/0140827 | A1 * | 6/2013 | Carroll | 290/55 |
| 2013/0206921 | A1 | 8/2013 | Paduano et al. | |
| 2013/0221154 | A1 * | 8/2013 | Vander Lind et al. | 244/54 |
| 2013/0221679 | A1 * | 8/2013 | Vander Lind | 290/55 |
| 2014/0361122 | A1 * | 12/2014 | Ruiterkamp | 244/154 |

OTHER PUBLICATIONS

Casau, "Autonomous Transition Flight for a Vertical Take-Off and Landing Aircraft", https://dspace.ist.utl.pt/bitstream/2295/71851411/tese.pdf, Sep. 2010.

International Search Report and Written Opinion prepared by the Korean Patent Office in International Patent Application Serial No. PCT/US2014/072008 mailed Apr. 13, 2015.

Frank, Adrian, et al., Hover, Transition, and Level Flight Control Design for a Single-Propeller Indoor Airplane, American Institute of Aeronautics and Astronautics, pp. 1-18, http://acl.mit.edu/papers/GNC_airplane_Aug_2007_v0.pdf.

"Autonomous Airborne Wind Power" Recorded Web Video [online], Makani, YouTube, May 13, 2013. [Retrieved on Apr. 9, 2015] from Internet: https://www.youtube.com/watch?v=hbPXXpaW5ws&list=UU-iMZJ8NppwT2fLwzFWJKOQ.

"Autonomous Airborne Wind Flight May 9, 2013" Recorded Web Video [online], Makani, YouTube, May 13, 2013. [Retrieved on Apr. 9, 2015] from Internet: https://www.youtube.com/watch?v=jYN0yrntB2M&list=UU-iMZJ8NppwT2fLwzFWJKOQ.

"Makani Power, 2012 Testing Program" Recorded Web Video [online], Makani, YouTube, Nov. 14, 2012. [Retrieved on Apr. 9, 2015] from Internet: https://www.youtube.com/watch?v=Guie8JY2FTs&list=UU-iMZJ8NppwT2fLwzFWJKOQ.

"Airborne Wind Turbine Flight Demonstrations" Recorded Web Video [online], Makani, YouTube, May 4, 2012. [Retrieved on Apr. 9, 2015] from Internet: https://www.youtube.com/watch?v=ww_Y10sVboU&list=UU-iMZJ8NppwT2fLwzFWJKOQ.

"All Flight Modes of Makani AWT" Recorded Web Video [online], Makani, YouTube, Feb. 28, 2012. [Retrieved on Apr. 9, 2015] from Internet: https://www.youtube.com/watch?v=9icw1oocUto&list=UU-iMZJ8NppwT2fLwzFWJKOQ.

"Autonomous Transition to Hover" Recorded Web Video [online], Makani, YouTube, Dec. 20, 2011. [Retrieved on Apr. 9, 2015] from Internet: https://www.youtube.com/watch?v=EU4ayk6QRyE&list=UU-iMZJ8NppwT2fLwzFWJKOQ.

"Makani Power, Autonomous Power Generation, Jul. 8, 2011" Recorded Web Video [online], Makani, YouTube, Aug. 30, 2011. [Retrieved on Apr. 9, 2015] from Internet: https://www.youtube.com/watch?v=sKcp3h0VIK0&list=UU-iMZJ8NppwT2fLwzFWJKOQ.

"Makani Power, tethered hover and crosswind flight, Sept 17, 2010" Recorded Web Video [online], Makani, YouTube, Oct. 8, 2010. [Retrieved on Apr. 9, 2015] from Internet: https://www.youtube.com/watch?v=34zeD5B0g2E&list=UU-iMZJ8NppwT2fLwzFWJKOQ.

"Makani Power Autonomous Flight. Jun. 18, 2010—HD" Recorded Web Video [online], Makani, YouTube, Jul. 19, 2010. [Retrieved on Apr. 9, 2015] from Internet:https://www.youtube.com/watch?v=IH-GpeXC5Jk&list=UU-iMZJ8NppwT2fLwzFWJKOQ.

"Autonomous flight of wing 3 (glider). Aug. 24, 2009" Recorded Web Video [online], Makani, YouTube, Jul. 16, 2010. [Retrieved on Apr. 9, 2015] from Internet https://www.youtube.com/watch?v=ziefzZ5Mel4&list=UU-iMZJ8NppwT2fLwzFWJKOQ.

Lass, Stan, Tethered Planes for Lifting and Power Generation, [Retrieved on Aug. 16, 2013] from Internet http://showcase.netins.net/web/stanlass/tether.html.

* cited by examiner

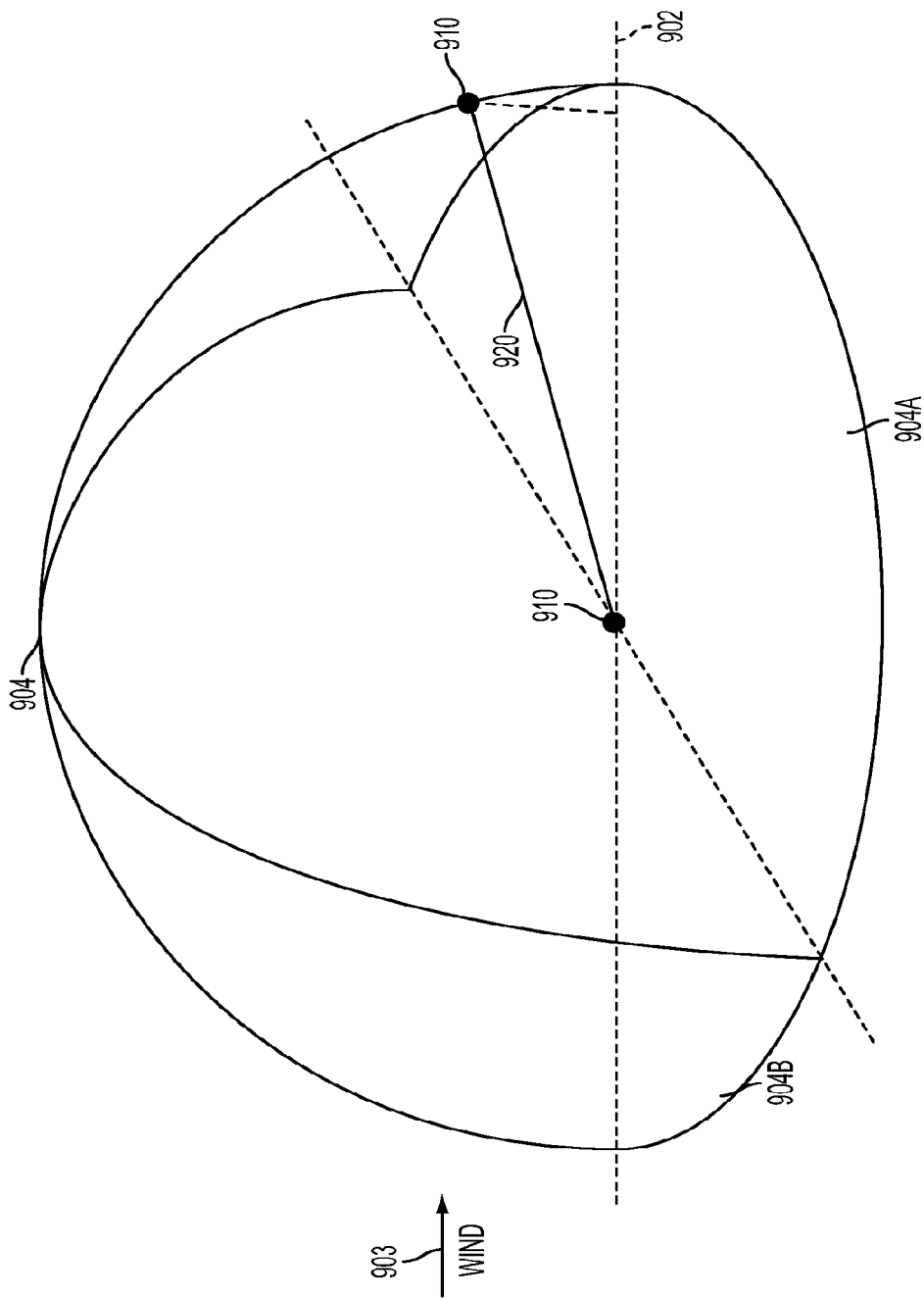

METHODS AND SYSTEMS FOR TRANSITIONING AN AERIAL VEHICLE BETWEEN CROSSWIND FLIGHT AND HOVER FLIGHT

BACKGROUND

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for transitioning an aerial vehicle between certain flight modes that facilitate conversion of kinetic energy to electrical energy are described herein. In particular, embodiments described herein relate to transitioning an aerial vehicle from crosswind flight to hover flight. Beneficially, embodiments described herein may improve entering hover flight by quickly reducing a speed of the aerial vehicle at a low altitude. Further, embodiments described herein may help the aerial vehicle to transition from crosswind flight to hover flight without entering another flight mode.

In one aspect, a method may involve operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is in the crosswind-flight orientation, operating the aerial vehicle to travel along a second closed path on the tether sphere, such that a speed of the aerial vehicle is reduced; and after or while the speed of the aerial vehicle is reduced, transitioning the aerial vehicle from traveling along the second closed path while in the crosswind-flight orientation to a hover-flight orientation.

In another aspect, a system may include an aerial vehicle connected to a first end of a tether; a ground station connected to a second end of the tether; and a control system configured to: operate the aerial vehicle to travel along a first closed path on a tether sphere while oriented in a crosswind-flight orientation, wherein the tether sphere has a radius corresponding to a length of the tether; while the aerial vehicle is in the crosswind-flight orientation, operate the aerial vehicle to travel along a second closed path on the tether sphere, such that a speed of the aerial vehicle is reduced, and after or while the speed of the aerial vehicle is reduced, transition the aerial vehicle from traveling along the second closed path while in the crosswind-flight orientation to a hover-flight orientation.

In another aspect, a non-transitory computer readable medium having stored therein instructions executable by a computing device to cause the computing device to perform functions is disclosed. The functions include: operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is in the crosswind-flight orientation, operating the aerial vehicle to travel along a second closed path on the tether sphere, such that a speed of the aerial vehicle is reduced; and after or while the speed of the aerial vehicle is reduced, transitioning the aerial vehicle from traveling along the second closed path while in the crosswind-flight orientation to a hover-flight orientation.

In another aspect, a method may involve operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and after or while the speed of the aerial vehicle is reduced, transitioning the aerial vehicle from traveling along the closed path while in the crosswind-flight orientation to a hover-flight orientation.

In another aspect, a system may include an aerial vehicle connected to a first end of a tether; a ground station connected to a second end of the tether; and a control system configured to: operate the aerial vehicle to travel along a closed path on a tether sphere while oriented in a crosswind-flight orientation, wherein the tether sphere has a radius corresponding to a length of the tether; while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and after or while the speed of the aerial vehicle is reduced, transitioning the aerial vehicle from traveling along the closed path while in the crosswind-flight orientation to a hover-flight orientation.

In another aspect, a non-transitory computer readable medium having stored therein instructions executable by a computing device to cause the computing device to perform functions is disclosed. The functions include: operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and after or while the speed of the aerial vehicle is reduced, transitioning the aerial vehicle from traveling along the closed path while in the crosswind-flight orientation to a hover-flight orientation.

In another aspect, a system may include means for operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is in the crosswind-flight orientation, means for operating the aerial vehicle to travel along a second closed path on the tether sphere, such that a speed of the aerial vehicle is reduced; and after or while the speed of the aerial vehicle is reduced, means for transitioning the aerial vehicle from traveling along the second closed path while in the crosswind-flight orientation to a hover-flight orientation.

In yet another aspect, a system may involve means for operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is traveling along the closed path in the crosswind-flight orientation, means for reducing a speed of the aerial vehicle by operating the aerial vehicle such that a drag on the aerial vehicle is increased or a lift on the aerial vehicle is decreased; and after or while the speed of the aerial vehicle is reduced, means for transitioning the aerial vehicle from traveling along the closed path while in the crosswind-flight orientation to a hover-flight orientation.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIGS. 9a and 9b depict a tether sphere, according to an example embodiment.

DETAILED DESCRIPTION

Figure 1:
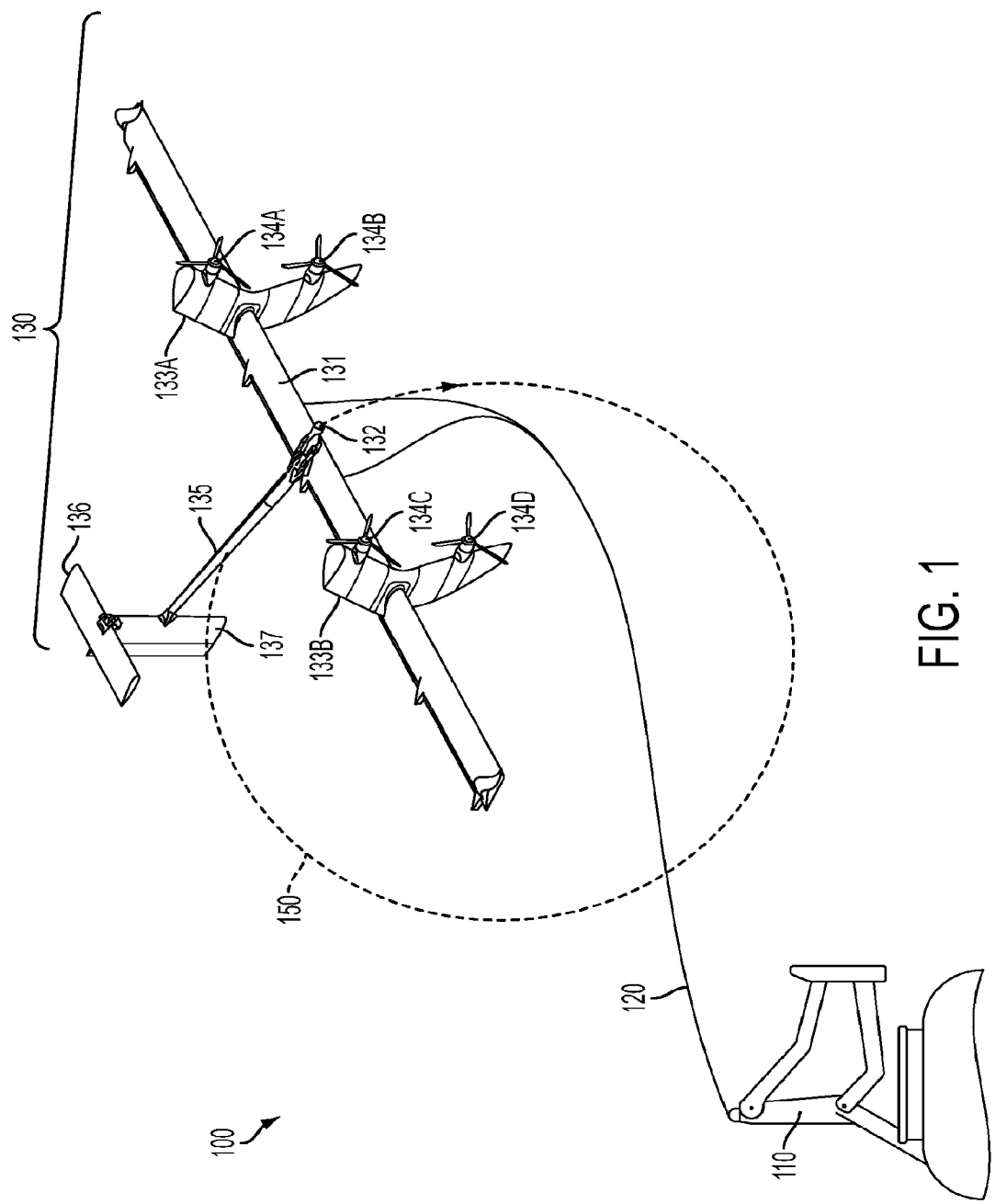
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods and systems and can be arranged and combined in a wide variety of different configurations, all of which are contemplated herein.

I. Overview

Illustrative embodiments relate to aerial vehicles, which may be used in a wind energy system, such as an Airborne Wind Turbine (AWT). In particular, illustrative embodiments relate to or take the form of methods and systems for transitioning an aerial vehicle between certain flight modes that facilitate conversion of kinetic energy to electrical energy.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station transmits electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle vertically ascends or descends in hover flight.

In crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle generates electrical energy by slowing down the incident wind. Further, in some implementations, the closed path includes an upstroke and a down stroke. The aerial vehicle may be propelled substantially upwards during the upstroke, and the aerial vehicle may be propelled substantially downwards during the down stroke. Moreover, a speed of the aerial vehicle in the upstroke may be less than a speed of the aerial vehicle in the down stroke.

The aerial vehicle may enter crosswind flight when (i) the aerial vehicle has attached flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station. And the aerial vehicle may enter hover flight when the aerial vehicle does not have attached flow.

In some implementations, a tension of the tether during crosswind flight is greater than the tension of the tether during hover flight. For instance, the tension of the tether during crosswind flight may be 15 kilonewtons (KN), and the tension of the tether during hover flight may be 1 KN.

Embodiments described herein relate to transitioning an aerial vehicle from crosswind flight to hover flight. In an illustrative implementation, a method involves: operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is in the crosswind-flight orientation, operating the aerial vehicle to travel along a second closed path on the tether sphere, such that a speed of the aerial vehicle is reduced; and after or while the speed of the aerial vehicle is reduced, transitioning the aerial vehicle from traveling along the second closed path while in the crosswind-flight orientation to a hover-flight orientation.

Further, in another illustrative implementation, a method involves: operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and after or while the speed of the aerial vehicle is reduced, transitioning the aerial vehicle from traveling along the closed path while in the crosswind-flight orientation to a hover-flight orientation.

Beneficially, such implementations may improve entering hover flight by quickly reducing speed of the aerial vehicle at a low altitude. Further, such implementations may allow the aerial vehicle to transition from crosswind flight to hover flight without entering another flight mode. Moreover, such implementations may help to smooth a variation in a tension of the tether between crosswind flight and hover flight.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be operated to stabilize the aerial vehicle 130 and/or reduce drag on the aerial vehicle during hover flight, forward flight, and/or crosswind flight. In addition, in some examples, the control surfaces may be operated to increase drag and/or decrease lift on the aerial vehicle 130 during crosswind flight. In some examples, one or more control surfaces may be located on a leading edge of the main wing 131. Further, in some examples, one or more other control surfaces may be located on a trailing edge of the main wing 131.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons that are configured to connect the rotors 134A-D to the main wing 131. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. In some examples, the rotors 134A-D may be operated to increase drag on the aerial vehicle 130 during crosswind flight. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of a AWT

Figure 2:
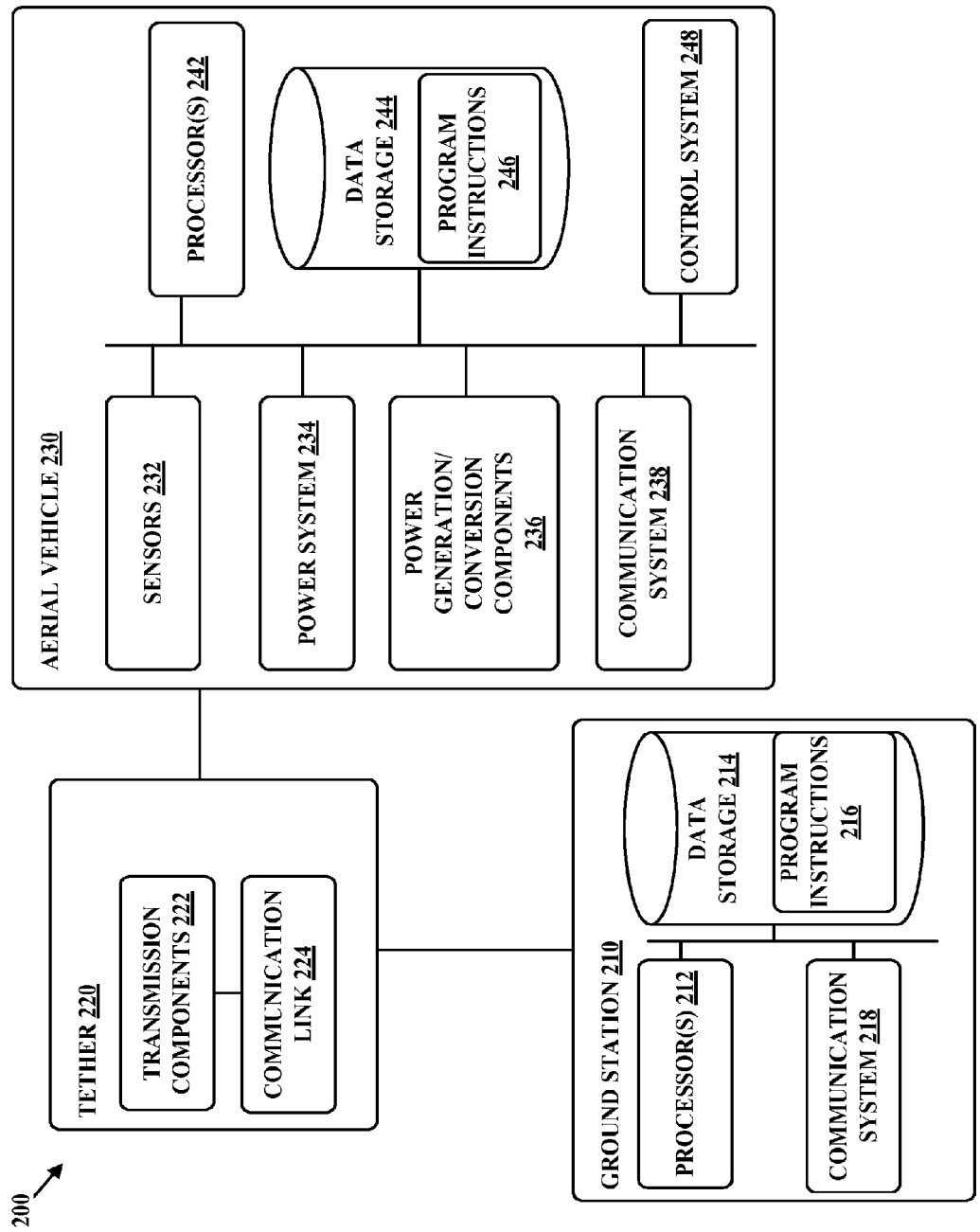
FIG. 2 is a simplified block diagram illustrating components of an AWT, according to an example embodiment.

FIG. 2 is a simplified block diagram illustrating components of the AWT 200.

The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a Nano-ElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 120.

C. Crosswind Flight

Figure 3:
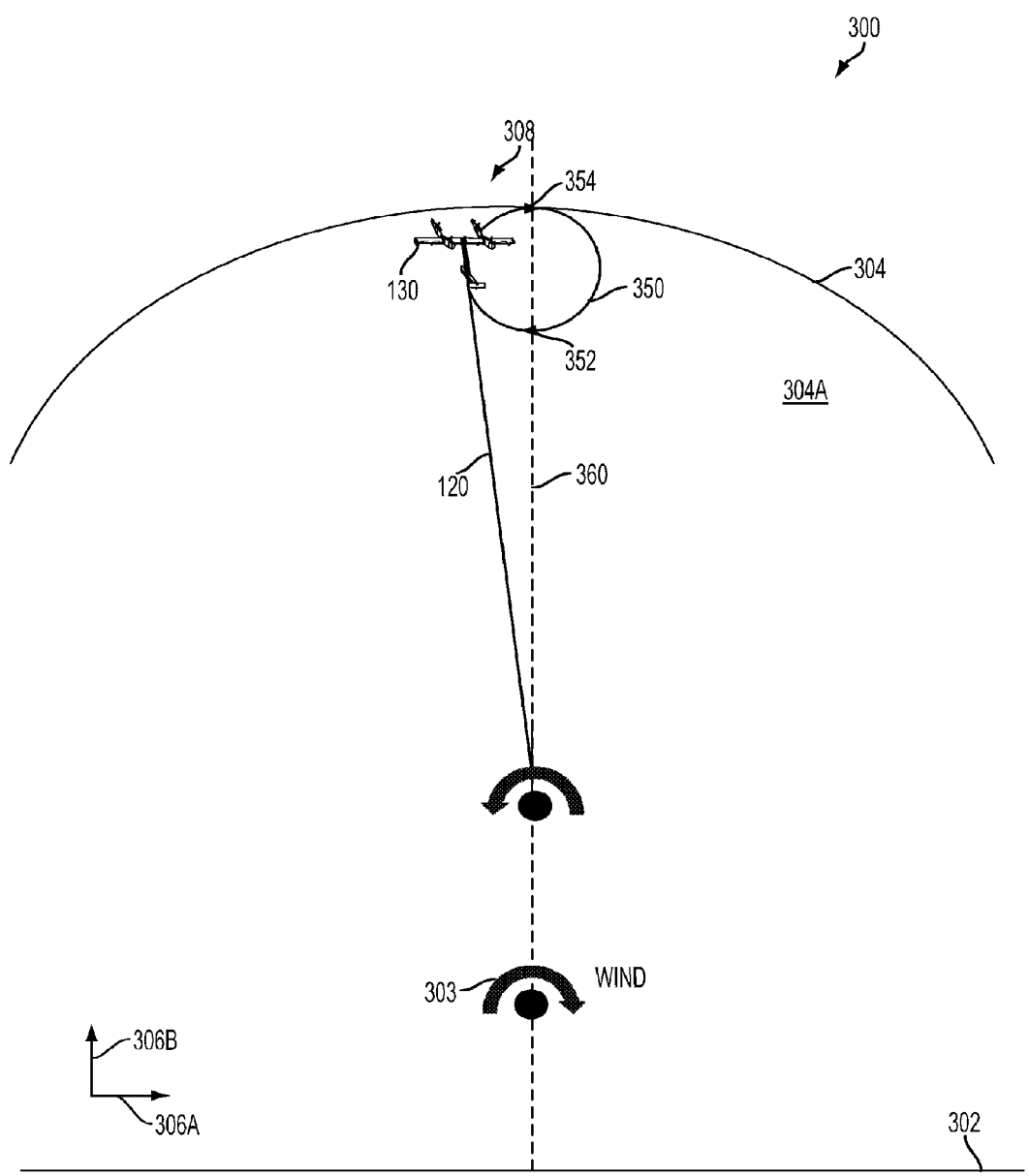
FIG. 3 depicts an example of an aerial vehicle in crosswind flight, according to an example embodiment.

FIG. 3 depicts an example 300 of crosswind flight. Example 300 is generally described by way of example as being carried out by the aerial vehicle 130 described above in connection with FIG. 1. For illustrative purposes, example 300 is described in an action as shown in FIG. 3, though example 300 could be carried out in any number of actions and/or combinations of actions.

In particular, FIG. 3 shows a view from the ground station 110 of the aerial vehicle 130 flying above ground 302. In the illustrated example, wind 303 may contact a tether sphere 304. The wind 303 may be directed into the page (as indicated by the clockwise arrow). Further, the tether sphere 304 may have radius corresponding to a length of the tether 120. Example 300 may be carried out substantially on a portion 304A of the tether sphere 304. The term "substantially on," as used in this disclosure, refers to exactly on or one or more deviations from exactly on that do not significantly impact transitioning an aerial vehicle from crosswind flight to hover flight as described herein. In the portion 304A of the tether sphere 304, a first axis 306A corresponds with an azimuthal direction, and a second axis 306B corresponds with an elevational direction.

Further still, as shown in FIG. 3, the tether 120 is connected to the aerial vehicle 130 on the first end. In the illustrated example, a portion of the tether 120 may be directed out of the page (as indicated by the counterclockwise arrow).

Example 300 begins at a point 308 with operating the aerial vehicle 130 to travel along a closed path 350 on the tether sphere 304 in a crosswind-flight orientation. In the crosswind-flight orientation, the aerial vehicle 130 may be configured for crosswind flight as described herein. With this arrangement, at point 308 the aerial vehicle 130 may generate electrical energy. The closed path 350 may take the form of or be similar in form to the closed path 150. For instance, in the illustrated example, the closed path 350 may be substantially circular. However, in other examples, the closed path 350 may be any of the various different shapes described with reference to the closed path 150.

At point 308, the aerial vehicle 130 may be propelled by the wind 303 along the closed path 350. As shown in FIG. 3, the closed path 350 may include an upstroke 352 and a down stroke 354. In example 300, the upstroke 352 may include a portion of the closed path 350 that the aerial vehicle 130 travels counterclockwise, and the down stroke 354 may include a portion of the path 350 that the aerial vehicle travels clockwise. With this arrangement, the aerial vehicle 130 may be propelled by the wind 303 substantially upwards during the upstroke 352, and the aerial vehicle 130 may propelled by the wind 303 substantially downwards during the down stroke 354. Moreover, a speed of the aerial vehicle 130 in the upstroke 352 may be less than a speed of the aerial vehicle 130 in the down stroke 354.

The term "substantially upwards," as used in this disclosure, refers to exactly upwards and/or one or more deviations from exactly upwards that do not significantly impact transitioning from crosswind flight to hover flight as described herein. The term "substantially downwards," as used in this disclosure, refers to exactly downwards and/or one or more deviations from exactly downwards that do not significantly impact transitioning from crosswind flight to hover flight as described herein.

At point 308, the aerial vehicle 130 may be operated to travel along substantially all of the closed path 350 (which may be referred to as a revolution of the closed path 350). The term "substantially all," as used in this disclosure, refers to exactly all or one or more deviations from exactly all that do not significantly impact transitioning an aerial vehicle from crosswind flight to hover flight as described herein.

In addition, at point 308 the aerial vehicle 130 may be operated to travel along one or more revolutions of the closed path 350. For instance, the aerial vehicle 130 may be operated to travel along one revolution of the closed path 350, two revolutions of the closed path 350, three revolutions of the closed path 350, etc.

Further, at point 308 the aerial vehicle 130 may be operated to travel along a portion of the closed path 350. For instance, the aerial vehicle 130 may be operated to travel along one half of the closed path 350, one quarter of the closed path, etc.

Further still, at point 308 the aerial vehicle 130 may be operated to travel along a combination of one or more revolutions of the closed path 350 and one or more portions of the closed path 350. For instance, the aerial vehicle 130 may be operated to travel along two revolutions of the closed path 350 and then one portion of the closed path 350.

In another aspect, an axis 360 may intersect the closed path 350. In the illustrated example, the axis 360 may be substantially downwind of the ground station 110. The term "substantially downwind," as used in this disclosure, refers to exactly downwind or one or more deviations from exactly downwind that do not significantly impact transitioning an aerial vehicle from crosswind flight to hover flight as described herein.

One or more actions that correspond with point 308 may be performed at various different time periods in various different embodiments. For instance, the one or more actions that correspond with point 308 may be performed at a first time period.

Although example 300 has described with the ground station 110 located on the ground 302, in other examples the ground station 110 may be mobile. For instance, the ground station 110 may be configured to move relative to the ground 302 or a surface of a body of water. With this arrangement, the wind 303 may be a relative wind from the perspective of the ground station 110.

E. Transitioning an Aerial Vehicle from Crosswind Flight to Hover Flight

Figure 4:
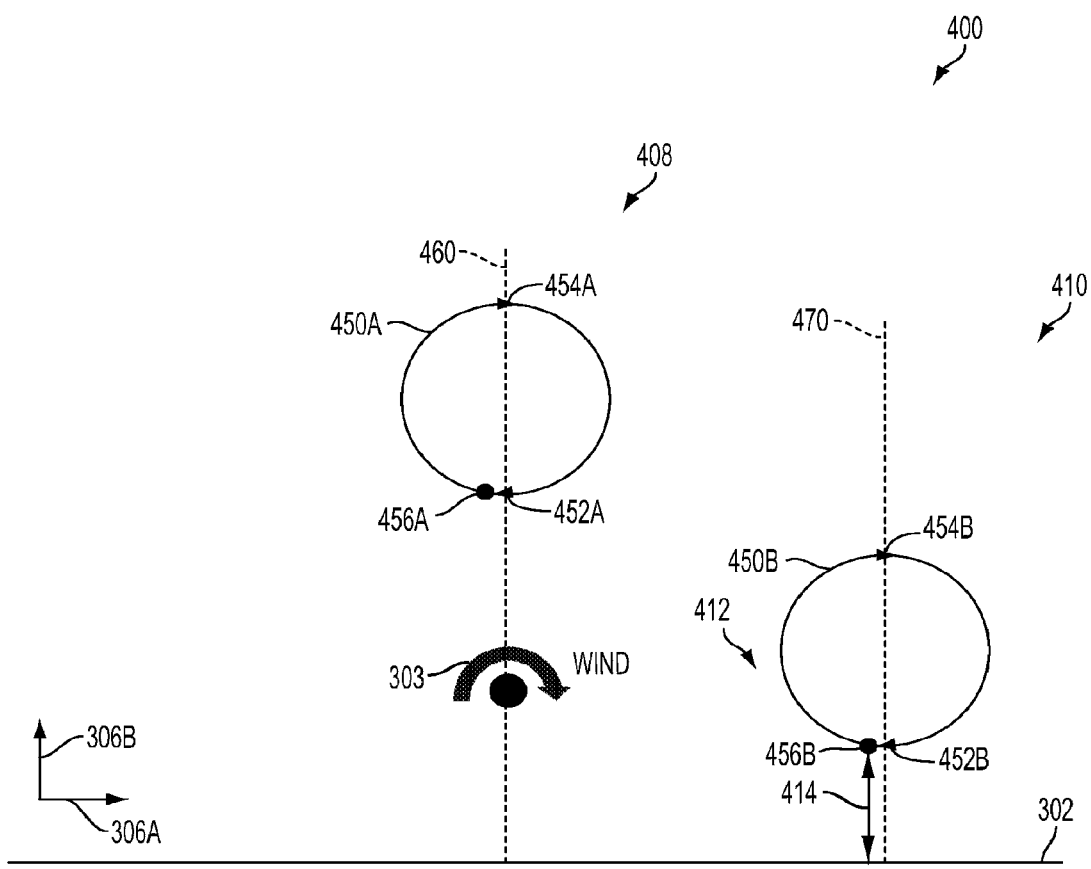
FIG. 4 depicts an example of an aerial vehicle transitioning from crosswind flight to hover flight, according to an example embodiment.

FIG. 4 depicts an example 400 of transitioning an aerial vehicle from crosswind flight to hover flight, according to an example embodiment. In particular, example 400 involves operating an aerial vehicle to travel along a second closed path 450B, such that a speed of the aerial vehicle is reduced. Example 400 is generally described by way of example as being carried out by the aerial vehicle 130 described above in connection with FIG. 1. For illustrative purposes, the aerial vehicle 130 is not shown in FIG. 4. Further, example 400 is described in a series of actions as shown in FIG. 4, though example 400 could be carried out in any number of actions and/or combinations of actions.

And as in FIG. 3, FIG. 4 shows a view from the ground station 110 above the ground 302, the wind 303 may be directed into the page, and the first axis 306A corresponds with an azimuthal direction and the second axis 306B corresponds with an elevational direction.

Example 400 begins at a point 408 with operating the aerial vehicle 130 to travel along a first closed path 450A on the tether sphere 304 while oriented in a crosswind-flight orientation. With this arrangement, at point 408, the aerial vehicle 130 may generate electrical energy. The first closed path 450A may take the form of or be similar in form to the closed path 150 and/or the closed path 350. For instance, in the illustrated example, the first closed path 450A may be substantially circular. However, in other examples, the first closed path 450A may be any of the various different shapes described above with reference to closed path 150.

At point 408, the aerial vehicle 130 may be propelled by the wind 303 along the first closed path 450A. As shown in FIG. 4, the path 450 may include an upstroke 452A and a down stroke 454A. The upstroke 452A may take the form of or be similar in form to the upstroke 352, and the down stroke 454A may take the form of or be similar in form to the upstroke 354.

At point 408, the aerial vehicle 130 may be operated to travel along substantially all of the first closed path 450A (which may be referred to as a revolution of the first closed path 450A), a portion of the first closed path 450A, and/or a combination of one or more revolutions of the first closed path 450A and one or more portions of the first closed path 450A the same or similar way as at point 308 the aerial vehicle 130 may be operated to travel along substantially all of the closed path 350, a portion of the closed path 350, and/or a combination of one or more revolutions of the closed path 350 and one or more portions of the closed path 350 as described with reference to FIG. 3.

Example 400 continues at a point 410 with operating the aerial vehicle 130 to travel along the second closed path 450B on the tether sphere 304 while in the crosswind-flight orientation. The second closed path 450B may include an upstroke 452B and a down stroke 454B. In the illustrated example, the second closed path 450B may be substantially circular. However, in other examples, the second closed path 450B may be any of the various different shapes described above for the closed path 150.

At point 410, the aerial vehicle 130 may be propelled less by the wind 303 along the second closed path 450B than the aerial vehicle 130 may be propelled by the wind 303 along the first closed path 450A at point 408. As a result, a speed of the aerial vehicle 130 at point 410 may be less than a speed of the aerial vehicle 130 at point 408.

In addition, in some examples, at point 410 the aerial vehicle 130 may generate electrical energy. Further, in some such examples, the electrical energy generated by the aerial vehicle 130 at point 410 may be less than the electrical energy generated by the aerial vehicle 130 at point 408. However, in other examples, at point 410 the aerial vehicle 130 may not generate electrical energy.

As shown in FIG. 4, a first axis 460 may intersect the first closed path 450A and a second axis 470 may intersect the second closed path 450B, and the first axis 460 may be substantially downwind of the ground station 110 and the second axis 470 may be less downwind from the ground station 110. With this arrangement, a point 456B on the second closed path 450B may be at an angle away from substantially downwind from the ground station 110. In some examples, the angle may be between 30 to 90 degrees in azimuth, such as between 30 to 60 degrees in azimuth. Further, in at least one such example, the angle may be selected based on one or more parameters of the aerial vehicle 130 or one or more other components of the AWT 100.

In addition, in some examples, where a point on the second closed path 450B (e.g., the point 456B) is at a certain angle away from substantially downwind from the ground station 110, such as at an angle less than 90 degrees in azimuth, at point 410 the aerial vehicle 130 may not generate electrical energy.

In addition, the point 456B on the second closed path 450B may be located at an altitude that is less than an altitude of a corresponding point 456A of the first closed path 450. In some examples, the point 456B on the second closed path 450B may be a predetermined altitude 414 above the ground 302. The predetermined altitude 414 may be selected based on one or more parameters of the aerial vehicle 130 or one or more other components of the AWT 100.

Moreover, as shown in FIG. 4, the second axis 470 may be located to the right of the first axis 460. With this arrangement, at least a portion of the upstroke 452B of the second closed path 450B may be located closer to downwind from the ground station 110 than at least a portion of the down stroke 454B of the second closed path 450B. Accordingly, stability of the aerial vehicle 130 during the transition from the crosswind-flight orientation to the hover-flight orientation may be improved. However, in other examples, the second axis 470 may be located to the left of the first axis 460. With this arrangement, the aerial vehicle 130 may not be propelled by the wind 303 during an upstroke of a second closed path 450B. Accordingly, the reduction of the speed of the aerial vehicle 130 may be increased.

At point 410, the aerial vehicle 130 may be operated to travel along substantially all of the second closed path 450B (which may be referred to as a revolution of second closed path 450B). In addition, at point 410 the aerial vehicle 130 may be operated to travel along one or more revolutions of the second closed path 450B. For instance, the aerial vehicle 130 may be operated to travel along one revolution of the second closed path 450B, two revolutions of the second closed path 450B, three revolutions of the second closed path 450B, etc.

Further, at point 410 the aerial vehicle 130 may be operated to travel along a portion of the second closed path 450B. For instance, the aerial vehicle 130 may be operated to travel along one half of the second closed path 450B, one quarter of the second closed path 450B, etc.

Further still, the aerial vehicle 130 may be operated to travel along a combination of one or more revolutions of the second closed path 450B and one or more portions of the second closed path 450B. For instance, the aerial vehicle 130 may be operated to travel along two revolutions of the second closed path 450B and then one portion of the second closed path 450B.

In some examples, a reduction in the speed of the aerial vehicle 130 may increase as the number of revolutions of the second closed path 450B the aerial vehicle 130 is operated to travel along increases. For instance, a reduction in the speed of the aerial vehicle 130 when the aerial vehicle 130 is operated to travel along more than one revolution of the second closed path 450B may be greater than a reduction in the speed of the aerial vehicle 130 when the aerial vehicle 130 is operated to travel along one revolution of the second closed path 450B.

Further, in some examples, a reduction in the speed of the aerial vehicle 130 may increase as the number of portions of the second closed path 450B the aerial vehicle 130 is operated to travel along increases. For instance, a reduction in the speed of the aerial vehicle 130 when the aerial vehicle 130 is operated to travel along more than one portion of the second closed path 450B may be greater than a reduction in the speed of the aerial vehicle 130 when the aerial vehicle 130 is operated to travel along one portion of the second closed path 450B.

Example 400 continues at point 412 with after or while the speed of the aerial vehicle 130 is reduced, transitioning the aerial vehicle 130 from traveling along the second closed path 450B while in the crosswind-flight orientation to a hover-flight orientation. In the hover-flight orientation, the aerial vehicle 130 may be configured for hover flight as described herein.

In some examples, transitioning the aerial vehicle 130 from traveling along the second closed path 450B while in the crosswind-flight orientation to the hover-flight orientation may involve a flight maneuver.

Moreover, in some examples, the aerial vehicle 130 may transition from traveling along the second closed path 450B while in the crosswind-flight orientation to a hover-flight orientation during the upstroke 452B of the second closed path 450B.

Further, in some examples, the aerial vehicle 130 may transition from traveling along the second closed path 450B while in the crosswind-flight orientation to a hover-flight orientation at a threshold speed. Further, in some such examples, the threshold speed may be between 10 to 30 m/s, such as 20 m/s.

Further still, in some examples, the threshold speed for the transition from the crosswind-flight orientation to the hover-flight orientation may vary based on a location along the second closed path 450B where the aerial vehicle 130 transitions from the crosswind-flight orientation to the hover-flight orientation. As one example, the threshold speed may decrease as an altitude of a point along the second closed path 450B where the aerial vehicle 130 transitions from the crosswind-flight orientation to the hover-flight orientation increases.

One or more actions that correspond with points 408-412 may be performed at various different time periods in various different embodiments. For instance, the one or more actions that correspond with point 408 may be performed at a first time period, the one or more actions that correspond with point 410 may be performed at a second time period, and the one or more actions that correspond with point 412 may be performed at a third time period.

In some examples, the aerial vehicle 130 may transition from traveling along the first closed path 450A to traveling along the second closed path 450B. Further, in some such examples, the transition may involve traveling along one or more other paths (e.g., one or more other closed paths on the tether sphere 304) that are each located between the first closed path 450A and the second closed path 450B. In addition, in some such examples, the transition may occur between the first and second time periods.

Figure 5:
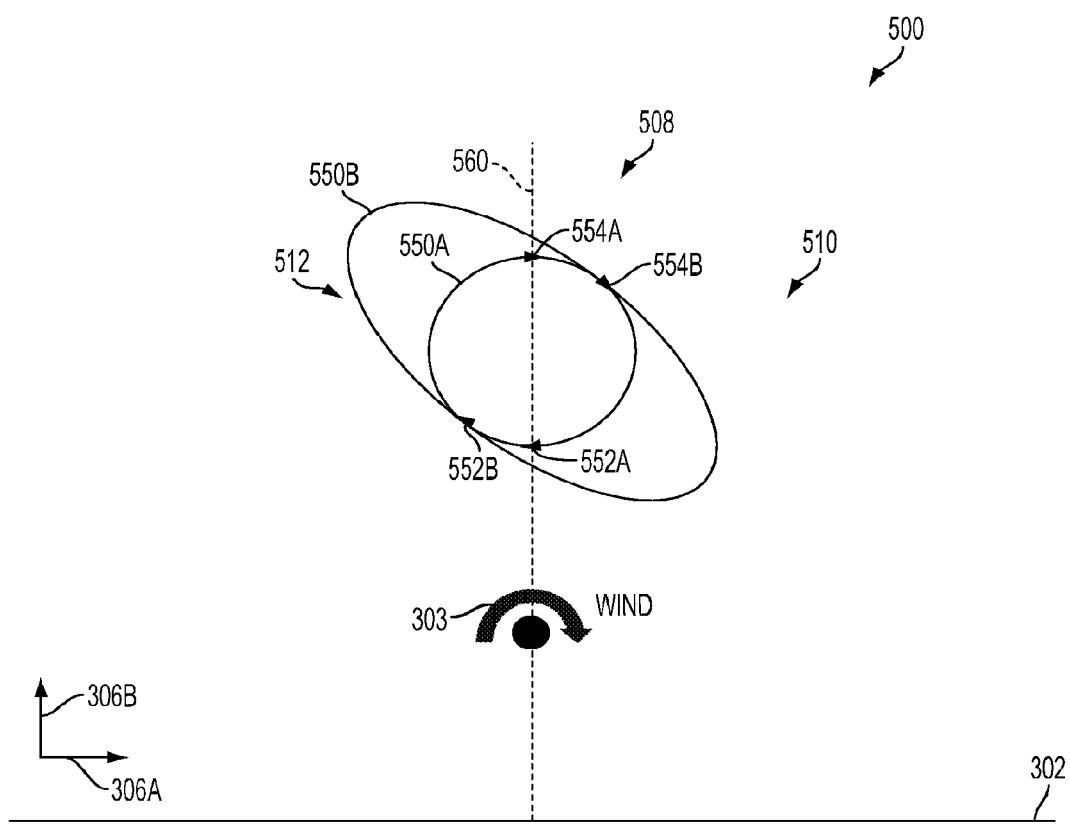
FIG. 5 depicts another example of an aerial vehicle transitioning from crosswind flight to hover flight, according to an example embodiment.

FIG. 5 depicts another example 500 of transitioning an aerial vehicle from crosswind flight to hover flight, according to an example embodiment. In particular, example 500 involves operating an aerial vehicle to travel along a second closed path 550B, such that a speed of the aerial vehicle is reduced. Example 500 is generally described by way of example as being carried out by the aerial vehicle 130 described above in connection with FIG. 1. For illustrative purposes, the aerial vehicle 130 is not shown in FIG. 5. Further, example 500 is described in a series of actions as shown in FIG. 5, though example 500 could be carried out in any number of actions and/or combinations of actions.

And as in FIGS. 3 and 4, FIG. 5 shows a view from the ground station 110 above the ground 302, the wind 303 may be directed into the page, and the first axis 306A corresponds with an azimuthal direction and the second axis 306B corresponds with an elevational direction.

Example 500 begins at a point 508 with operating the aerial vehicle 130 to travel along a first closed path 550A on the tether sphere 304 while oriented in a crosswind-flight orientation. With this arrangement, at point 508 the aerial vehicle 130 may generate electrical energy. The first closed path 550A may take the form of or be similar in form to the closed path 150, the closed path 350, and/or the first closed path 450A. For instance, in the illustrated example, the first closed path 550A may be substantially circular. However, in other examples, the first closed path 550A may be any of the various shaped described above with reference to closed path 150.

The aerial vehicle 130 may be propelled by the wind 303 along the first closed path 550A. As shown in FIG. 5, the first closed path 550A may include an upstroke 552A and a down stroke 554A. The upstroke 552A may take the form of or be similar in form to the upstroke 352 and/or the upstroke 452A, and the down stroke 554A may take the form of or be similar in form to the upstroke 354 and/or the down stroke 454A.

Further, as shown in FIG. 5, an axis 560 may intersect the first closed path 550A, and the axis 560 may be substantially downwind of the ground station 110. The axis 560 may take the form of or be similar in form to the axis 360 and/or the first axis 460.

At point 508, the aerial vehicle 130 may be operated to travel along substantially all of the first closed path 550A (which may be referred to as a revolution of the first closed path 550A), a portion of the first closed path 550A, and/or a combination of one or more revolutions of the first closed path 550A and one or more portions of the first closed path 550A the same or similar way as at point 308 the aerial vehicle 130 may be operated to travel along substantially all of the closed path 350, a portion of the closed path 350, and/or a combination of one or more revolutions of the closed path 350 and one or more portions of the closed path 350 in example 300 and/or at point 408 the aerial vehicle 130 may be operated to travel along substantially all of the first closed path 450A, a portion of the first closed path 450A, and/or a combination of one or more revolutions of the first closed path 450A and one or more portions of the first closed path 450A in example 400.

Example 500 continues at a point 510 with operating the aerial vehicle 130 to travel along the second closed path 550B on the tether sphere 304 while in the crosswind-flight orientation. The second closed path 550B may include an upstroke 552B and a down stroke 554B.

As shown in FIG. 5, the second closed path 550B may have a shape that is different than the first closed path 550A. With this arrangement, a length of the upstroke 554B of the second closed path 550B may be greater than a length of the upstroke 554A of the first closed path 550A. As a result, at point 510 a speed of the aerial vehicle 130 may be less than the speed of the aerial vehicle 130 at point 508.

In the illustrated example, the second closed path 550B is an oval (e.g., an ellipse) and the first closed path 550A is substantially circular. Other shapes of the path 550A and the second closed path 550B are possible as well, such as the shape of a jelly bean, the shape of a FIG. 8, etc. In some examples, the shape of the second closed path 550B may be selected to increase a length of the upstroke 554B.

In addition, in some examples, at point 510 the aerial vehicle 130 may generate electrical energy. Further, in some such examples, the electrical energy generated by the aerial vehicle 130 at point 510 may be less than the electrical energy generated by the aerial vehicle 130 at point 508. However, in other examples, at point 510 the aerial vehicle 130 may not generate electrical energy. Further still, in some examples, where a point on the second closed path 550B is at a certain angle away from substantially downwind from the ground station 110, such as at an angle less than 90 degrees in azimuth, at point 510 the aerial vehicle 130 may not generate electrical energy.

At point 510, the aerial vehicle 130 may be operated to travel along substantially all of the second closed path 550B (which may be referred to as a revolution of the second closed path 550B), a portion of the second closed path 550B, and/or a combination of one or more revolutions of the second closed path 550B and one or more portions of the second closed path 550B the same or similar way as at point 408 the aerial vehicle 130 may be operated to travel along substantially all of the second closed path 450B, a portion of the second closed path 450B, and/or a combination of one or more revolutions of the second closed path 450B and a portion of the second closed path 450B as in example 400.

With this arrangement, a reduction in the speed of the aerial vehicle 130 may increase as the number of revolutions of the second closed path 550B the aerial vehicle 130 is operated to travel along increases. For instance, a reduction in the speed of the aerial vehicle 130 when the aerial vehicle 130 is operated to travel along more than one revolution of the second closed path 550B may be greater than a reduction in the speed of the aerial vehicle 130 when the aerial vehicle 130 is operated to travel along one revolution of the second closed path 550B.

Further, in some examples, a reduction in the speed of the aerial vehicle 130 may increase as the number of portions of the second closed path 550B the aerial vehicle 130 is operated to travel along increases. For instance, a reduction in the speed of the aerial vehicle 130 when the aerial vehicle 130 is operated to travel along more than one portion of the second closed path 550B may be greater than a reduction in the speed of the aerial vehicle 130 when the aerial vehicle 130 is operated to travel along one portion of the second closed path 550B.

Example 500 continues at point 512 with after or while the speed of the aerial vehicle 130 is reduced, transitioning the aerial vehicle 130 from traveling along the second closed path 550B while in the crosswind-flight orientation to a hover-flight orientation.

At point 512, after or while the speed of the aerial vehicle 130 is reduced, the aerial vehicle 130 may transition from traveling along the second closed path 550B while in the crosswind-flight orientation to the hover-flight orientation the same or similar way as at point 412, after or while the speed of the aerial vehicle 130 is reduced, the aerial vehicle 130 may transition from traveling along the second closed path 450B while in the crosswind-flight orientation as in example 400.

For instance, in some examples, transitioning the aerial vehicle 130 from traveling along the second closed path 550B while in the crosswind-flight orientation to the hover-flight orientation may involve a flight maneuver. The flight maneuver may take the form of or be similar in form to the flight maneuver at point 412 in example 400.

Moreover, in some examples, the aerial vehicle 130 may transition from traveling along the second closed path 550B while in the crosswind-flight orientation to a hover-flight orientation during the upstroke 552B of the second closed path 550B.

Further, in some examples, the aerial vehicle 130 may transition from traveling along the second closed path 550B while in the crosswind-flight orientation to a hover-flight orientation at a threshold speed. The threshold speed may take the form of or be similar in form to the threshold speed at point 412 in example 400.

Further still, in some examples, the threshold speed for the transition from the crosswind-flight orientation to the hover-flight orientation may vary based on a location along the second closed path 550B where the aerial vehicle 130 transitions from the crosswind-flight orientation to the hover-flight orientation. As one example, the threshold speed may decrease as an altitude of a point along the second closed path 550B where the aerial vehicle 130 transitions from the crosswind-flight orientation to the hover-flight orientation increases.

One or more actions that correspond with points 508-512 may be performed at various different time periods in various different embodiments. For instance, the one or more actions that correspond with point 508 may be performed at a first time period, the one or more actions that correspond with point 510 may be performed at a second time period, and the one or more actions that correspond with point 512 may be performed at a third time period.

In some examples, the aerial vehicle 130 may transition from traveling along the first closed path 550A to traveling along the second closed path 550B. Further, in some such examples, the transition may involve traveling along one or more other paths (e.g., one or more other closed paths on the tether sphere 304). In addition, in some such examples, the transition may occur between the first and second time periods.

Moreover, one or more actions of example 500 may be performed in connection with one or more actions of example 400. With this arrangement, a speed of the aerial vehicle 130 may be reduced by traveling along the second closed path 450B and the speed of the aerial vehicle 130 may be further reduced by traveling along the second closed path 550B. For instance, the aerial vehicle 130 may be operated to travel along the second closed path 450B while in a crosswind-flight orientation, such that a speed of the aerial vehicle 130 is reduced as in point 410 of example 400. After or while a speed of the aerial vehicle 130 is reduced, the aerial vehicle 130 may be operated to travel along the second closed path 550B while in the crosswind-flight orientation, such that the speed of the aerial vehicle 130 is further reduced as in point 510 of example 500.

In addition, a speed of the aerial vehicle 130 may be reduced by traveling along the second closed path 550B and the speed of the aerial vehicle 130 may be further reduced by traveling along the second closed path 450B. For instance, the aerial vehicle 130 may be operated to travel along the second closed path 550B while in a crosswind-flight orientation, such that a speed of the aerial vehicle 130 is reduced as in point 510 of example 500. After or while a speed of the aerial vehicle 130 is reduced, the aerial vehicle 130 may be operated to travel along the second closed path 450B while in the crosswind-flight orientation, such that the speed of the aerial vehicle 130 is further reduced as in point 410 of example 400.

Moreover, in some situations, the aerial vehicle 130 may travel along the second closed path 550B and (i) may travel along the second closed path 450B and (ii) may travel along the first closed path 550A or the first closed path 450A. For example, the aerial vehicle 130 may be operated to travel along the second closed path 550B while in a crosswind-flight orientation, such that a speed of the aerial 130 vehicle is reduced. And in some such examples, when one or more actions that the correspond with point 512 are not performed, the aerial vehicle 130 may be operated to travel along the second closed path 450B while in the crosswind-flight orientation as in point 410 of example 400 and the aerial vehicle 130 may be operated to travel along the first closed path 550A or the first closed path 450A as in point 408 of example 400.

Figure 6:
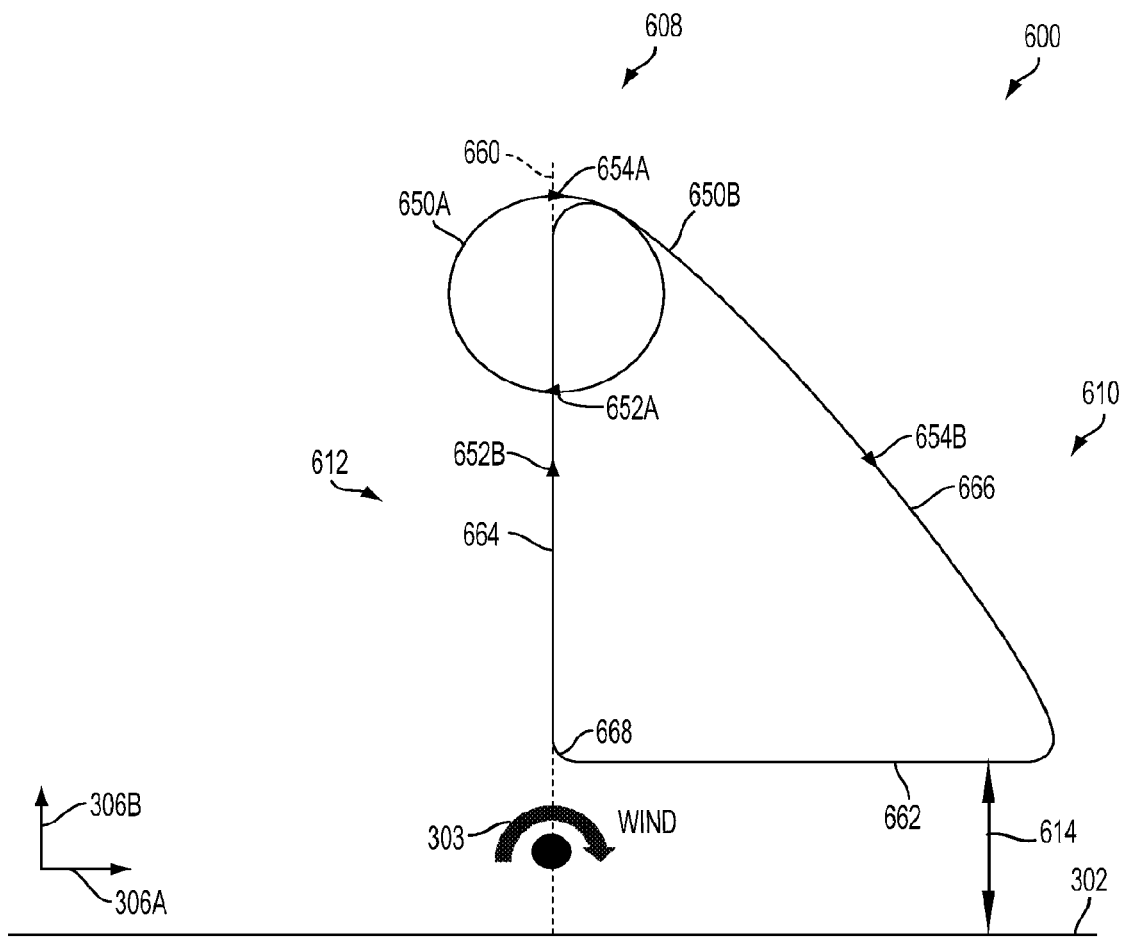
FIG. 6 depicts another example of an aerial vehicle transitioning from crosswind flight to hover flight, according to an example embodiment.

FIG. 6 depicts yet another example 600 of transitioning an aerial vehicle from crosswind flight to hover flight, according to an example embodiment. In particular, example 600 involves operating an aerial vehicle to travel along a second closed path 650B. Example 600 is generally described by way of example as being carried out by the aerial vehicle 130 described above in connection with FIG. 1. For illustrative purposes, the aerial vehicle 130 is not shown in FIG. 6. Further, example 600 is described in a series of actions as shown in FIG. 6, though example 600 could be carried out in any number of actions and/or combinations of actions.

And as in FIGS. 3-5, FIG. 6 shows a view from the ground station 110 above the ground 302, the wind 303 may be directed into the page, and the first axis 306A corresponds with an azimuthal direction and the second axis 306B corresponds with an elevational direction.

Example 600 begins at a point 608 with operating the aerial vehicle 130 to travel along a first closed path 650A on the tether sphere 304 while oriented in a crosswind-flight orientation. With this arrangement, the aerial vehicle 130 may generate electrical energy. The first closed path 650A may take the form of or be similar in form to the closed path 150, the closed path 350, the first closed path 450A, and/or the first closed path 550A. For instance, in the illustrated example, the first closed path 650A may be substantially circular. However, in other examples, the first closed path 650A may be any of the various shaped described above with reference to closed path 150.

The aerial vehicle 130 may be propelled by the wind 303 along the first closed path 650A. As shown in FIG. 6, the first closed path 650A may include an upstroke 652A and a down stroke 654A. The upstroke 652A may take the form of or be similar in form to the upstroke 352, the upstroke 452A, and/or the upstroke 552A, and the down stroke 554A may take the form of or be similar in form to the down stroke 354, the down stroke 454A, and/or the down stroke 554A.

Further, as shown in FIG. 6, an axis 660 may intersect the first closed path 650A, and the axis 660 may be substantially downwind of the ground station 110. The axis 660 may take the form of or be similar in form to the axis 360, the first axis 460, and/or the axis 560.

At point 608, the aerial vehicle 130 may be operated to travel along substantially all of the first closed path 550A and/or a portion of the first closed path 550A the same or similar way as at point 308 the aerial vehicle 130 may be operated to travel along substantially all of the closed path 350 and/or a portion of the closed path 350 as in example 300, at point 408 the aerial vehicle 103 may be operated to travel along substantially all of the first closed path 450A and/or a portion of the first closed path 450A as in example 400, and/or at point 508 the aerial vehicle 130 may be operated to travel along substantially all of the first closed path 550A and/or a portion of the first closed path 550A as in example 500.

Example 600 continues at point 610 with operating the aerial vehicle 130 to travel along the second closed path 650B on the tether sphere 304 while in the crosswind-flight orientation. The second closed path 650B includes an upstroke 652B and a down stroke 654B.

As shown in FIG. 6, the second closed path 650B may have a shape that is different that the first closed path 650A. With this arrangement, a length of the upstroke 654B of the second closed path 650B may be greater than a length of the upstroke 654A of the first closed path 650A. As a result, at point 610 a speed of the aerial vehicle 130 may be less than the speed of the aerial vehicle 130 at point 608.

In particular, the second closed path 650B has a first portion 662 and a second portion 664. As shown in FIG. 6, the first portion 662 of the second closed path 650B may be at a substantially constant elevation and the second portion 664 of the second closed path 650B may be at a substantially constant azimuth. Further, in some examples, the first portion 662 of the second closed path 650B may be located at a predetermined altitude 614 above the ground 302. The predetermined altitude 614 may be selected based on one or more parameters of the aerial vehicle 130 or one or more other components of the AWT 100.

In addition, as shown in FIG. 6, the second portion 664 of the second closed path 650B may be substantially on the axis 660. In other examples, the second portion 664 of the second closed path 650B may be substantially parallel to the axis 660.

In some examples, the upstroke 652B may be located along the first portion 662 and the second portion 664 of the second closed path 650B. With this arrangement, a length of the upstroke 652B of the second closed path 650B may be greater than a length of the upstroke of the other second closed paths described herein, such as the up stroke 452B of the second closed path 450B in example 400 and the up stroke 552B of the second closed path 550B in example 500.

Further, as shown in FIG. 6, the second closed path 650B may further include an arc 668 that connects the first portion 662 of the second closed path 650B to the second portion 664 of the second closed path 650B. With this arrangement, operating the aerial vehicle 130 to travel along the second closed path 650B may involve operating the aerial vehicle 130 to travel along the arc 668. In some examples, the arc 668 may have a predetermined curvature. Further, in some such examples, the predetermined curvature may be a maximum curvature that the aerial vehicle 130 is configured to travel. In some examples, operating the aerial vehicle 130 to travel along the second closed path 650B may involve quickly turning the aerial vehicle 130 upward to the second portion 664 of the second closed path 650B.

Further still, as shown in FIG. 6, the second closed path 650B may further include a third portion 666 of the second closed path 650B. In some examples, the down stroke 654B of may be located along the third portion 666 of the second closed path 650.

In addition, in some examples, at point 610 the aerial vehicle 130 may generate electrical energy. Further, in some such examples, the electrical energy generated by the aerial vehicle 130 at point 610 may be less than the electrical energy generated by the aerial vehicle 130 at point 608. However, in other examples, at point 610 the aerial vehicle 130 may not generate electrical energy. Further still, in some examples, where a point on the second closed path 650B is at a certain angle away from substantially downwind from the ground station 110, such as at an angle less than 90 degrees in azimuth, at point 610 the aerial vehicle 130 may not generate electrical energy.

At point 610, the aerial vehicle 130 may be operated to travel along substantially all of the second closed path 650B (which may be referred to as a revolution of the second closed path 650B), a portion of the second closed path 550B (e.g., the first portion 662, the second portion 664, and the third portion 666) and/or a combination of one or more revolutions of the second closed path 650B and one or more portions of the second closed path 650B the same or similar way as at point 408 the aerial vehicle 130 may be operated to travel along substantially all of the second closed path 450B, a portion of the second closed path 450B, and/or a combination of one or more revolutions of the second closed path 450B and a portion of the second closed path 450B as in example 400 and/or at point 508 the aerial vehicle 130 may be operated to travel along substantially all of the second closed path 550B, a portion of the second closed path 550B, and/or a combination of one or more revolutions of the second closed path 550B and a portion of the second closed path 550B as in example 500.

With this arrangement, a reduction in the speed of the aerial vehicle 130 may increase as the number of revolutions of the second closed path 650B the aerial vehicle 130 is operated to travel along increases. For instance, a reduction in the speed of the aerial vehicle 130 when the aerial vehicle 130 is operated to travel along more than one revolution of the second closed path 650B may be greater than a reduction in the speed of the aerial vehicle 130 when the aerial vehicle 130 is operated to travel along one revolution of the second closed path 650B.

Further, in some examples, a reduction in the speed of the aerial vehicle 130 may increase as the number of portions of the second closed path 550B is operated to travel along increases. For instance, a reduction in the speed of the aerial vehicle 130 when the aerial vehicle 130 is operated to travel along more than one portion of the second closed path 650B may be greater than a reduction in the speed of the aerial vehicle 130 when the aerial vehicle 130 is operated to travel along one portion of the second closed path 650B.

Example 600 continues at a point 612 with after or while the speed of the aerial vehicle 130 is reduced, transitioning the aerial vehicle 130 from traveling along the second closed path 650B while in the crosswind-flight orientation to a hover-flight orientation.

At point 612, after or while the speed of the aerial vehicle 130 is reduced, the aerial vehicle 130 may transition from traveling along the second closed path 650B while in the crosswind-flight orientation to the hover-flight orientation the same or similar way as at point 412, after or while the speed of the aerial vehicle 130 is reduced, the aerial vehicle 130 may transition from traveling along the second closed path 450B while in the crosswind-flight orientation as in example 400 and/or at point 512, after or while the speed of the aerial vehicle 130 is reduced, the aerial vehicle 130 may transition from traveling along the second closed path 550B while in the crosswind-flight orientation as in example 500.

For instance, in some examples, transitioning the aerial vehicle 130 from traveling along the second closed path 650B while in the crosswind-flight orientation to the hover-flight orientation may involve a flight maneuver. The flight maneuver may take the form of or be similar in form to the flight maneuver at point 412 in example 400 and/or the flight maneuver at point 512 in example 500.

Moreover, in some examples, the aerial vehicle 130 may transition from traveling along the second closed path 650B while in the crosswind-flight orientation to a hover-flight orientation during the upstroke 652B of the second closed path 650B.

Further, in some examples, the aerial vehicle 130 may transition from traveling along the second closed path 650B while in the crosswind-flight orientation to a hover-flight orientation at a threshold speed. The threshold speed at point 612 may take the form of or be similar in form to the threshold speed at point 412 in example 400 and/or the threshold speed at point 512 in example 500.

Further still, in some examples, the threshold speed for the transition from the crosswind-flight orientation to the hover-flight orientation may vary based on a location along the second closed path 650B where the aerial vehicle 130 transitions from the crosswind-flight orientation to the hover-flight orientation. As one example, the threshold speed may decrease as an altitude of a point along the second closed path 650B where the aerial vehicle 130 transitions from the crosswind-flight orientation to the hover-flight orientation increases.

One or more actions that correspond with points 608-612 may be performed at various different time periods in various different embodiments. For instance, the one or more actions that correspond with point 608 may be performed at a first time period, the one or more actions that correspond with point 610 may be performed at a second time period, and the one or more actions that correspond with point 612 may be performed at a third time period.

In some examples, the aerial vehicle 130 may transition from traveling along the first closed path 650A to traveling along the second closed path 650B. Further, in some such examples, the transition may involve traveling along one or more other paths (e.g., one or more other closed paths on the tether sphere 304). In addition, in some such examples, the transition may occur between the first and second time periods.

Moreover, example 600 may be performed in connection with one or more actions of example 400 and/or one or more actions of example 500. With this arrangement, a speed of the aerial vehicle 130 may be reduced by traveling along the second closed path 450B and/or the second closed path 550B and the speed of the aerial vehicle 130 may be further reduced by traveling along the second closed path 650B. For instance, the aerial vehicle 130 may be operated to travel along the second closed path 450B while in a crosswind-flight orientation as in point 410 of example 400 and/or the second closed path 550B while in the crosswind-flight orientation as in point 510 of example 500, such that a speed of the aerial vehicle 130 is reduced. After or while a speed of the aerial vehicle is reduced, the aerial vehicle 130 may be operated to travel along the second closed path 650B while in the crosswind-flight orientation, such that the speed of the aerial vehicle 130 is further reduced as in point 610 of example 600.

In addition, the aerial vehicle 130 may be operated to travel along the second closed path 650B while in the crosswind-flight orientation, such that a speed of the aerial vehicle 130 is reduced. After or while a speed of the aerial vehicle 130 is reduced, the aerial vehicle 130 may be operated to travel along the second closed path 450B while in a crosswind-flight orientation as in point 410 of example 400, such that a speed of the aerial vehicle 130 is further reduced and/or the second closed path 550B while in the crosswind-flight orientation as in point 510 of example 500, such that the speed of the aerial vehicle 130 is further reduced.

Moreover, in some situations, the aerial vehicle 130 may travel along the second closed path 650B and (i) may travel along the second closed path 450B and/or the second closed path 550B and (ii) may travel along the first closed path 650A, the first closed path 450A, or the first closed path 550A. For example, the aerial vehicle 130 may be operated to travel along the second closed path 650B while in a crosswind-flight orientation, such that a speed of the aerial 130 vehicle is reduced as in point 610 of example 600. And in some such examples, when one or more actions that the correspond with point 612 are not performed, the aerial vehicle 130 may be operated to travel along the second closed path 450B while in the crosswind-flight orientation as in point 410 of example 400 and/or the second closed path 550B while in the crosswind-flight orientation as in point 510 of example 500 and may be operated to travel along the first closed path 650A, the first closed path 450A as in point 408 of example 400, and/or the first closed path 550A as in point 508 of example 500.

Further, in some examples, an aerial vehicle, such as the aerial vehicle 130, may transition from crosswind flight to hover flight without traveling along a second closed path, such that a speed of the aerial vehicle is reduced. Instead, a speed of the aerial vehicle may be reduced by operating the aerial vehicle such that a drag on the aerial vehicle is increased or a lift on the aerial vehicle is decreased.

Figure 7A:
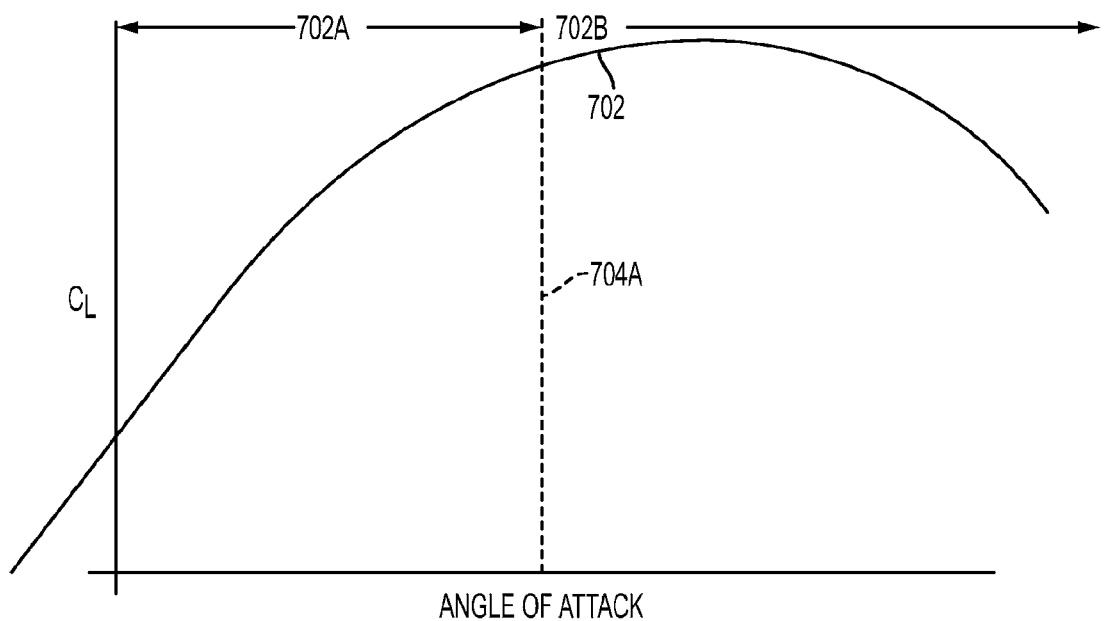
FIGS. 7a and 7b are graphical representations involving an angle of attack, according to an example embodiment.
Figure 7B:
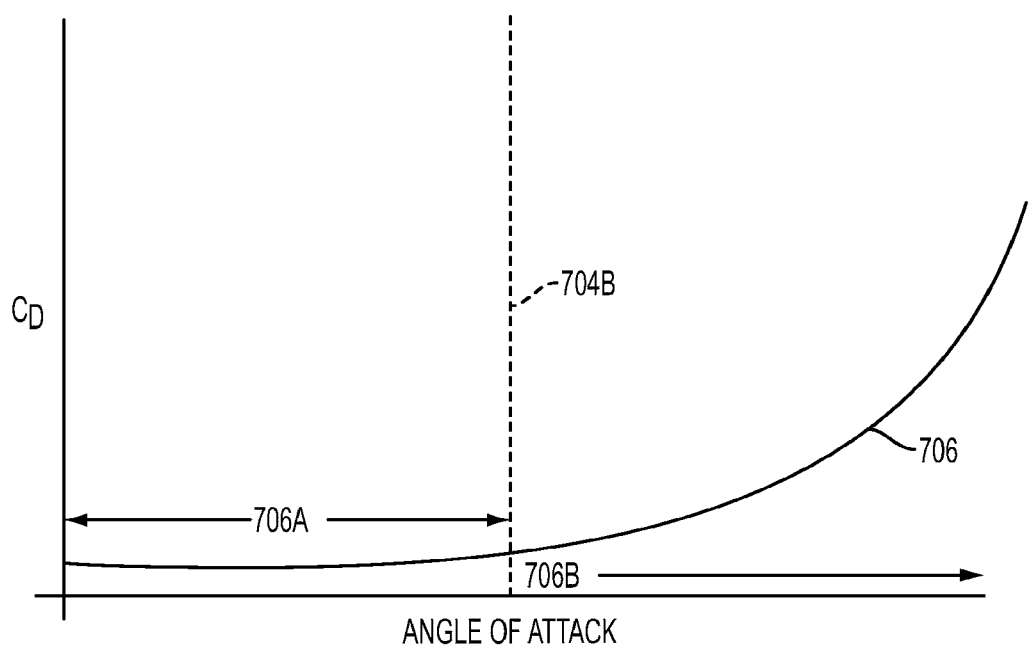

FIGS. 7a and 7b are graphical representations involving an angle of attack, according to an example embodiment. In particular, FIG. 7a is a graphical representation 702, and FIG. 7b is a graphical representation 706.

As shown in FIG. 7a, the graphical representation 702 represents coefficient of lift ($C_L$) in relation to angle of attack. $C_L$ may indicate a lift on the aerial vehicle, and the angle of attack may be an angle between a first axis of the aerial vehicle (e.g., a longitudinal axis) and an apparent wind vector projected into a plane defined (e.g., spanned) by the first axis of the aerial vehicle and a second axis of the aerial vehicle (e.g., a vertical axis). In addition, the angle of attack may be referred to as alpha.

The graphical representation 702 includes a first portion 702A and a second portion 702B. The first portion 702A corresponds with a range of values for $C_L$ for crosswind flight as described herein, and the second portion 702B corresponds with a range of values of $C_L$ for a stall condition as described herein. The axis 704A represents a boundary of the range of values for $C_L$ for crosswind flight and the range of values for $C_L$ for a stall condition. As shown in FIG. 7a, as the angle of attack increases, the $C_L$ may decrease.

As shown in FIG. 7b, the graphical representation 706 represents coefficient of drag ($C_D$) in relation to angle of attack. $C_D$ may indicate a drag on the aerial vehicle.

The graphical representation 706 includes a first portion 706A and a second portion 706B. The first portion 706A corresponds with a range of values for $C_D$ for crosswind flight as described herein, and the second portion 706B corresponds with a range of values of $C_D$ for a stall condition as described herein. The axis 704B represents a boundary of the range of values for $C_D$ for crosswind flight and the range of values for $C_D$ for a stall condition. As shown in FIG. 7b, as the angle of attack increases, the $C_D$ may increase.

Figure 8:
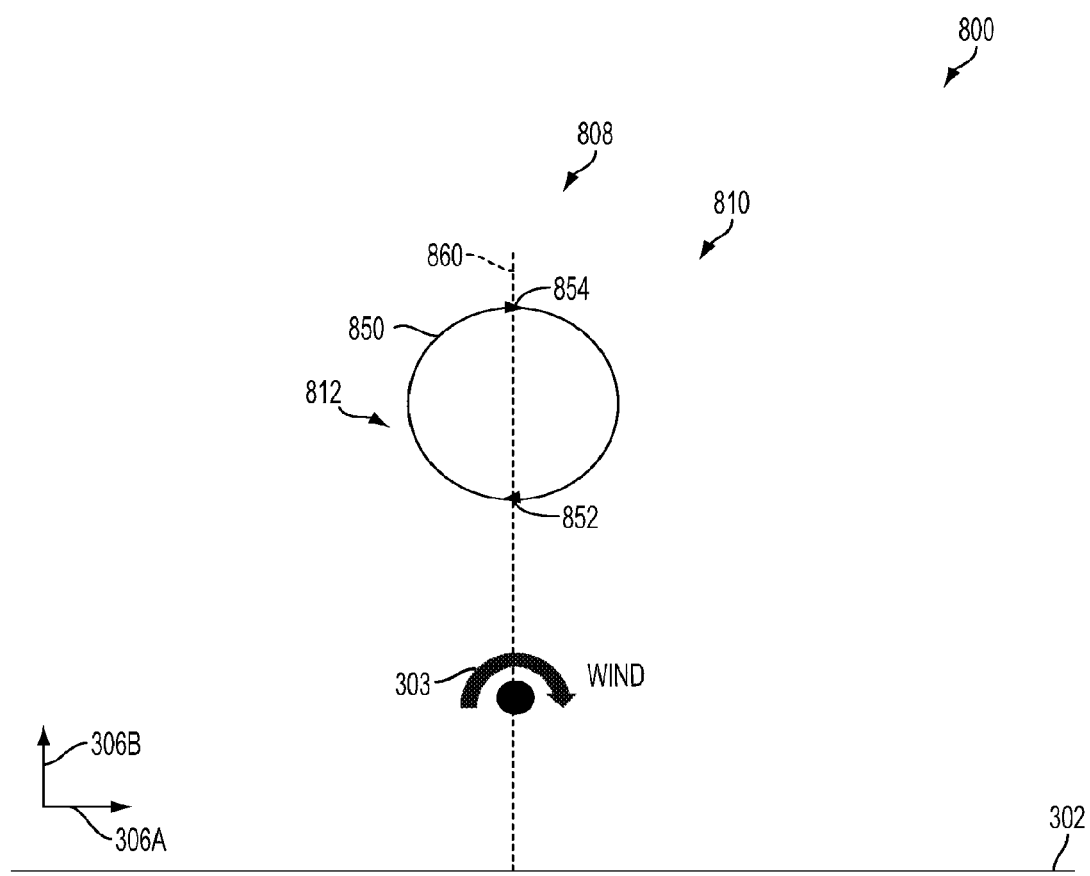
FIG. 8 depicts yet another example of an aerial vehicle transitioning from crosswind flight to hover flight, according to an example embodiment.

FIG. 8 depicts yet another example 800 of transitioning an aerial vehicle from crosswind flight to hover flight, according to an example embodiment. In particular, example 800 involves at point 810 reducing a speed of the aerial vehicle 130 by operating the aerial vehicle 130, such that a drag on the aerial vehicle 130 is increased or a lift the aerial vehicle 130 is decreased. Example 800 is generally described by way of example as being carried out by the aerial vehicle 130 described above in connection with FIG. 1. For illustrative purposes, the aerial vehicle 130 is not shown in FIG. 8. Further, example 800 is described in a series of actions as shown in FIG. 8, though example 800 could be carried out in any number of actions and/or combinations of actions.

And as in FIGS. 3-6, FIG. 8 shows a view from the ground station 110 above the ground 302, the wind 303 may be directed into the page, and the first axis 306A corresponds with an azimuthal direction and the second axis 306B corresponds with an elevational direction.

Example 800 begins at a point 808 with operating the aerial vehicle 130 to travel along a closed path 850 on the tether sphere 304 while oriented in a crosswind-flight orientation. With this arrangement, at point 808 the aerial vehicle 130 may generate electrical energy. The closed path 850 may take the form of or be similar in form to the closed path 150, the closed path 350, the first closed path 450A, the first closed path 550A, and/or the first closed path 650A. For instance, in the illustrated example, the closed path 850 may be substantially circular. However, in other examples, the closed path 850 may be any of the various shaped described above with reference to closed path 150.

The aerial vehicle 130 may be propelled by the wind 303 along the closed path 850. As shown in FIG. 5, the closed path 850 may include an upstroke 852 and a down stroke 854. The upstroke 852 may take the form of or be similar in form to the upstroke 352, the upstroke 452A, the upstroke 552A, and/or the upstroke 652A, and the down stroke 854 may take the form of or be similar in form to the down stroke 354, the down stroke 454A, the down stroke 554A, and/or the down stroke 654B.

Further, as shown in FIG. 8, an axis 860 may intersect the first closed path 550A, and the axis 560 may be substantially downwind of the ground station 110. The axis 860 may take the form of or be similar in form to the axis 360, the first axis 460, the first axis 560, and/or the first axis 660.

At point 808, the aerial vehicle 130 may be operated to travel along substantially all of the closed path 850 (which may be referred to as a revolution of the closed path 850), a portion of the closed path 850, and/or a combination of one or more revolutions of the closed path 850 and one or more portions of the closed path 850, the same or similar way as at point 308 the aerial vehicle 130 may be operated to travel along substantially all of the closed path 350, a portion of the closed path 350, and/or a combination of one or more revolutions of the closed path 350 and one or more portions of the closed path 350 in example 300, at point 408 the aerial vehicle 130 may be operated to travel along substantially all of the first closed path 450A, a portion of the first closed path 450A, and/or a combination of one or more revolutions of the first closed path 450A and one or more portions of the first closed path 450A in example 400, at point 508 the aerial vehicle 130 may be operated to travel along substantially all of the first closed path 550A, a portion of the first closed path 550A, and/or a combination of one or more revolutions of the first closed path 550A and one or more portions of the first closed path 550A in example 500, and/or at point 608 the aerial vehicle 130 may be operated to travel along substantially all of the first closed path 650A, a portion of the first closed path 650A, and/or a combination of one or more revolutions of the first closed path 650A and one or more portions of the first closed path 650A in example 600.

Example 800 continues at a point 810 with while the aerial vehicle 130 is traveling along the closed path 850 in the crosswind-flight orientation, reducing a speed of the aerial vehicle 130 by operating the aerial vehicle 130 such that a drag on the aerial vehicle 130 is increased or a lift on the aerial vehicle 130 is decreased. In some examples, the drag and/or the lift on the aerial vehicle 130 may act on a longitudinal axis of the aerial vehicle 130.

The aerial vehicle 130 may be operated such that a drag on the aerial vehicle 130 is increased in a variety of ways. As one example, the aerial vehicle 130 may be operated such that a drag on the aerial vehicle 130 is increased by increasing an angle of attack of the aerial vehicle 130, such that at least a portion of the main wing 131 stalls. With this arrangement, a drag on the aerial vehicle 130 based on that portion of the main wing 131 may be increased and the aerial vehicle 130 may not have attached flow at least around that portion of the main wing 131.

In addition, the aerial vehicle 130 may be operated such that a drag on the aerial vehicle 130 is increased by increasing an angle of attack of the aerial vehicle 130, such that the main wing 131 stalls. With this arrangement, a drag on the aerial vehicle 130 based on the main wing 131 may be increased and the aerial vehicle 130 may not have attached flow at least around the main wing 131.

Further, in some such examples, increasing the angle of attack of the aerial vehicle 130 may involve a flight maneuver, such as pitching up. Further still, in some such examples, the flight maneuver may be performed within a certain time period, such as within several seconds.

As another example, the aerial vehicle 130 may be operated such that a drag on the aerial vehicle 130 is increased by operating one or more control surfaces described herein of the main wing 131 to increase the drag on the aerial vehicle 130. In addition, operating the one or more control surfaces to increase the drag on the aerial vehicle 130 may involve injecting a reverse flow into a boundary layer of the aerial vehicle 130.

As another example, the aerial vehicle 130 may be operated such that a drag on the aerial vehicle 130 is increased by operating one or more rotors of the rotors 134A-D to increase the drag on the aerial vehicle 130. Further, in some such examples, operating the one or more rotors of the rotors 134A-D may involve setting the one or more rotors to a maximum drag. Further still, in some such examples, operating the one or more rotors of the rotors 134A-D may involve spinning the one or more rotors in a direction that is substantially opposite a direction that the one or more rotors spin during crosswind flight.

The term "substantially opposite," as used in this disclosure, refers to exactly opposite or one or more deviations from exactly opposite that do not significantly impact transitioning an aerial vehicle between crosswind flight and hover flight as described herein.

As yet another example, the aerial vehicle 130 may be operated such that a drag on the aerial 130 is increased by increasing a side slip angle of the aerial vehicle 130, such that one or more of the rotor connectors 133A-B stalls. With this arrangement, a drag on the aerial vehicle 130 based on the rotor connectors may be increased and the aerial vehicle 130 may not have attached flow at least not around the rotor connectors 133A-B. The side slip angle may be an angle between an apparent wind vector and a plane defined (e.g., spanned) by a first axis of the aerial vehicle 130 (e.g., a longitudinal axis) and a second axis of the aerial vehicle 130 (e.g., a vertical axis). In addition, the side slip angle may be referred to as beta.

The term "substantially perpendicular," as used in this disclosure, may refer to exactly perpendicular and/or one or more deviations from exactly perpendicular that do not significantly impact transitioning an aerial vehicle from crosswind flight to hover flight as described herein.

In addition, the speed of the aerial vehicle 130 may be reduced by performing any two or more of the examples described above for operating the aerial vehicle 130 such that a drag on the aerial vehicle 130 is increased. With this arrangement, a reduction in the speed of the aerial vehicle at point 810 may be increased.

For instance, at point 810 the drag on the aerial vehicle 130 may be increased by (i) increasing an angle of attack of the aerial vehicle 130, such that at least a portion of the main wing 130 stalls; (ii) operating one or more control surfaces of the main wing 130 to increase the drag on the aerial vehicle 130; (iii) operating one or more of the rotors 134A-D to increase the drag on the aerial vehicle 130; and/or (iv) increasing a side slip angle of the aerial vehicle 130, such that one or more of the rotor connectors 133A-B stalls.

Moreover, the aerial vehicle 130 may be operated such that a lift on the aerial vehicle 130 is decreased in a variety of ways. As one example, the aerial vehicle 130 may be operated such that a lift on the aerial vehicle is decreased by operating one or more control surfaces described herein of the main wing 131 to decrease the lift on the aerial vehicle 130. For instance, one or more control surfaces located on the trailing edge of the main wing 131 may be operated to decrease the lift on the aerial vehicle 130.

As another example, the aerial vehicle 130 may be operated such that a lift on the aerial vehicle 130 is decreased by decreasing an angle of attack of the aerial vehicle 130. For instance, the angle of attack of the aerial vehicle 130 may be decreased by adjusting one or more control surfaces of the main wing 131, such as at least one elevator of the main wing 131.

As yet another example, the aerial vehicle 130 may be operated such that a lift on the aerial vehicle 130 decreases by stalling at least a portion of the main wing 131. With this arrangement, a lift on the aerial vehicle 130 based on that portion of the main wing 131 may be decreased and the aerial vehicle 130 may not have attached flow at least around that portion of the main wing 131.

Further, the aerial vehicle 130 may be operated such that a lift on the aerial vehicle 130 decreases by stalling the main wing 131. With this arrangement, a lift on the aerial vehicle 130 based on the main wing 131 may be decreased and the aerial vehicle 130 may not have attached flow around the main wing 131.

In addition, the speed of the aerial vehicle 130 may be reduced by performing any two or more of the examples described above for operating the aerial vehicle 130 such that a lift on the aerial vehicle 130 is decreased. With this arrangement, a reduction in the speed of the aerial vehicle 130 at point 810 may be increased.

For instance, at point 810 the lift on the aerial vehicle may be decreased by (i) operating one or more control surfaces of the main wing 131 to decrease the lift on the aerial vehicle 130; (ii) decreasing an angle of attack of the aerial vehicle 130; and/or (iii) stalling at least a portion of the main wing 131.

Moreover, the speed of the aerial vehicle 130 may be reduced by operating the aerial vehicle 130 such that a drag on the aerial vehicle 130 is increased and a lift on the aerial vehicle 130 is decreased. With this arrangement, a reduction in the speed of the aerial vehicle 130 at point 810 may be increased.

For instance, at point 810 one or more of the examples described above for operating the aerial vehicle 130 such that a drag on the aerial vehicle 130 is increased may be performed in connection with one or more of the examples described above for operating the aerial vehicle 130 such that a lift on the aerial vehicle 130 is decreased.

In addition, in some examples, at point 810 the aerial vehicle 130 may generate electrical energy. Further, in some such examples, the electrical energy generated by the aerial vehicle 130 at point 810 may be less than the electrical energy generated by the aerial vehicle 130 at point 808. However, in other examples, at point 810 the aerial vehicle 130 may not generate electrical energy.

Further, at point 810 the aerial vehicle 130 may be operated such that a drag on the aerial vehicle 130 is increased or a lift on the aerial vehicle 130 is decreased by operating the aerial vehicle 130 such that the aerial vehicle 130 is in a static force balance. With this arrangement, a horizontal component of a velocity of the aerial vehicle 130 may be reduced.

Example 800 continues at a point 812 with after or while the speed of the aerial vehicle 130 is reduced, transitioning the aerial vehicle 130 from traveling along the closed path 850 while in the crosswind-flight orientation to a hover-flight orientation.

At point 812, after or while the speed of the aerial vehicle 130 is reduced, the aerial vehicle 130 may transition from traveling along the closed path 850 while in the crosswind-flight orientation to the hover-flight orientation the same or similar way as at point 412, after or while the speed of the aerial vehicle 130 is reduced, the aerial vehicle 130 may transition from traveling along the second closed path 450B while in the crosswind-flight orientation as in example 400, at point 512, after or while the speed of the aerial vehicle 130 is reduced, the aerial vehicle 130 may transition from traveling along the second closed path 550B while in the crosswind-flight orientation as in example 500, and/or at point 512, after or while the speed of the aerial vehicle 130 is reduced, the aerial vehicle 130 may transition from traveling along the second closed path 550B while in the crosswind-flight orientation as in example 500.

For instance, in some examples, transitioning the aerial vehicle 130 from traveling along the closed path 850 while in the crosswind-flight orientation to the hover-flight orientation may involve a flight maneuver. The flight maneuver may take the form of or be similar in form to the flight maneuver at point 412 in example 400, the flight maneuver at point 512 in example 500, and/or the flight maneuver at point 612.

Moreover, in some examples, the aerial vehicle 130 may transition from traveling along the closed path 850 while in the crosswind-flight orientation to a hover-flight orientation during the upstroke 852 of the closed path 850.

Further, in some examples, the aerial vehicle 130 may transition from traveling along the closed path 850 while in the crosswind-flight orientation to a hover-flight orientation at a threshold speed. The threshold speed at point 812 may take the form of or be similar in form to the threshold speed at point 412 in example 400, the threshold speed at point 512 in example 500, and/or the threshold speed at point 612.

Further still, in some examples, the threshold speed for the transition from the crosswind-flight orientation to the hover-flight orientation may vary based on a location along the closed path 850 where the aerial vehicle 130 transitions from the crosswind-flight orientation to the hover-flight orientation. As one example, the threshold speed may decrease as an altitude of a point along the closed path 850 where the aerial vehicle 130 transitions from the crosswind-flight orientation to the hover-flight orientation increases.

One or more actions that correspond with points 808-812 may be performed at various different time periods in various different embodiments. For instance, the one or more actions that correspond with point 808 may be performed at a first time period, the one or more actions that correspond with point 810 may be performed at a second time period, and the one or more actions that correspond with point 812 may be performed at a third time period.

Moreover, one or more actions of example 800 may be performed in connection with one or more actions of example 400, one or more actions of example 500, and/or one or more actions of example 600. With this arrangement, a speed of the aerial vehicle 130 may be reduced by traveling along the second closed path 450B, the second closed path 550B, and/or the second closed path 650B, and the speed of the aerial vehicle 130 may be further reduced by operating the aerial vehicle such that a drag on the aerial vehicle 130 is increased or a lift on the aerial vehicle 130 is decreased. For instance, the aerial vehicle 130 may be operated to travel along the second closed path 450B while in a crosswind-flight orientation as in point 410 of example 400, the second closed path 550B while in the crosswind-flight orientation as in point 510 of example 500, and/or the second closed path 650B while in the crosswind-flight orientation as in point 610 of example 600. After or while a speed of the aerial vehicle 130 is reduced, the speed of the aerial vehicle 130 may be further reduced by operating the aerial vehicle 130, such that a drag on the aerial vehicle 130 is increased or a lift on the aerial vehicle 130 is decreased as in point 810 of example 800.

In addition, a speed of the aerial vehicle 130 may reduced by operating the aerial vehicle 130, such that a drag on the aerial vehicle 130 is increased or a lift on the aerial vehicle is decreased and the speed may be reduced by traveling along the second closed path 450B, the second closed path 550B, and/or the second closed path 650B. For instance, a speed of the aerial vehicle 130 may be reduced by operating the aerial vehicle 130, such that a drag on the aerial vehicle 130 is increased or a lift the aerial vehicle 130 is decreased as in point 810 of example 800. After or while the speed of the aerial vehicle 130 is reduced, the speed of the aerial vehicle 130 may be operated to travel along the second closed path 450B while in a crosswind-flight orientation as in point 410 of example 400, the second closed path 550B while in the crosswind-flight orientation as in point 510 of example 500, and/or the second closed path 650B while in the crosswind-flight orientation as in point 610 of example 600.

Any or all of examples 400, 500, 600, and 800 may be performed without information provided by one or more sensors. In some such examples, the one or more sensors may include at least one of a load cell or a pitot tube.

Although examples 400, 500, 600, and 800 have described with the ground station 110 located on the ground 302, in other examples the ground station 110 may be mobile. For instance, the ground station 110 may be configured to move relative to the ground 302 or a surface of body of water. With this arrangement, the wind 303 may be a relative wind from the perspective of the ground station 110.

Figure 9A:
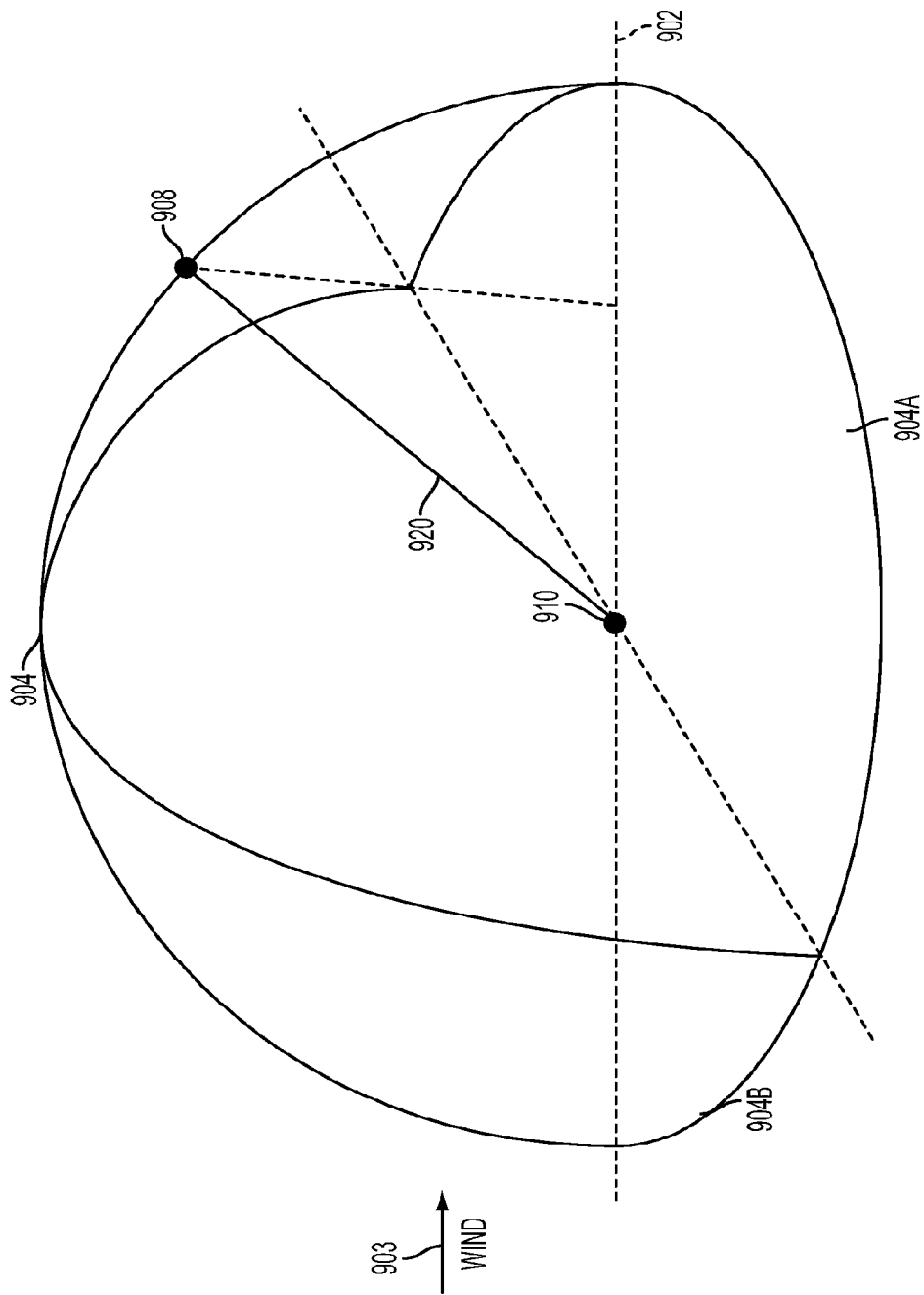

FIGS. 9a and 9b depict a tether sphere 904, according to an example embodiment. In particular, the tether sphere 904 has a radius corresponding to a length of a tether 920. In FIGS. 9a and 9b, the tether 920 is connected to an aerial vehicle (e.g., the aerial vehicle 130) on a first end and a ground station 910 on a second end, and the ground station 910 is located on ground 902. For purposes of explanation, the aerial vehicle is not shown in FIGS. 9a and 9b. Further, as shown in FIGS. 9a and 9b, wind 903 contacts the tether sphere 904. In FIGS. 9a and 9b, only a portion of the tether sphere 904 that is above the ground 902 is depicted. The portion may be described as one half of the tether sphere 904.

The ground 902 may take the form of or be similar in form to the ground 302, the wind 903 may take the form of or be similar the wind 303, the tether sphere 904 may take the form of or be similar in form to the tether sphere 304, the ground station 910 may take the form of or be similar in form to the ground station 110 and/or the ground station 210, and the tether 920 may take the form of or be similar in form to the tether 120 and/or the tether 220.

For instance, in some examples, the ground station 910 may be mobile as described herein, and the wind 903 may be a relative wind from the perspective of the ground station 910.

Examples of transitioning an aerial vehicle between crosswind flight and hover flight described herein may be carried out substantially on a first portion 904A of the tether sphere 904. As shown in FIGS. 9a and 9b, locations on the first portion 904A of the tether sphere 904 may be substantially downwind of the ground the station 910. The first portion 904A of the tether sphere 904 may be described as one quarter of the tether sphere 904. The first portion 904A of the tether sphere 904 may take the form of or be similar in form to the portion 904A of the tether sphere 904.

Moreover, examples of transitioning an aerial vehicle between crosswind flight and hover flight described herein may be carried out at a variety of locations on the first portion 904A of the tether sphere 904. For instance, as shown in FIG. 9a, at a point 908 while the aerial vehicle is in a crosswind-flight orientation, the aerial vehicle may be operated to travel along a closed path (e.g., the first closed path 450A, the first closed path 550A, the first closed path 650A, and/or the closed path 850) that is substantially on the first portion 904A of the tether sphere 904.

Further, as shown in FIG. 9b, at a point 910 while the aerial vehicle is in the crosswind flight orientation, the aerial vehicle may be operated to travel along another closed path (e.g., the second closed path 450B, the second closed path 550B, and/or the second closed path 650B) that is substantially on the first portion 904A of the tether sphere 904. In addition, at point 910 while the aerial vehicle is in the crosswind flight orientation, the aerial vehicle may be operated such that a drag on the aerial vehicle is increased or a lift of the aerial vehicle is decreased.

The point 908 may correspond to point 308 in example 300, point 408 in example 400, point 508 in example 500, point 608 in example 600, and/or point 808 in example 800; and the point 910 may correspond to point 410 in example 400, point 510 in example 500, point 610 in example 600, and/or point 810 in example 800.

Further, in accordance with this disclosure, the point 908 and the point 910 may be located at various locations that are substantially on the first portion 904A of the tether sphere 904.

In addition, examples of transitioning an aerial vehicle between crosswind flight and hover flight described herein may be carried out substantially on a second portion 904B of the tether sphere 904. As shown in FIGS. 9a and 9b, locations on the second portion 904B of the tether sphere 904 may be substantially upwind of the ground the station 910. The second portion 904B of the tether sphere 904 may be described as one quarter of the tether sphere 904.

The term "substantially upwind," as used in this disclosure, refers to exactly upwind and/or one or more deviations from exactly upwind that do not significantly impact transitioning an aerial vehicle form crosswind flight to hover flight as described herein.

For instance, in accordance with this disclosure, point 910 may be located at various locations that are substantially on the second portion 904B of the tether sphere 904.

III. Illustrative Methods

Figure 10:
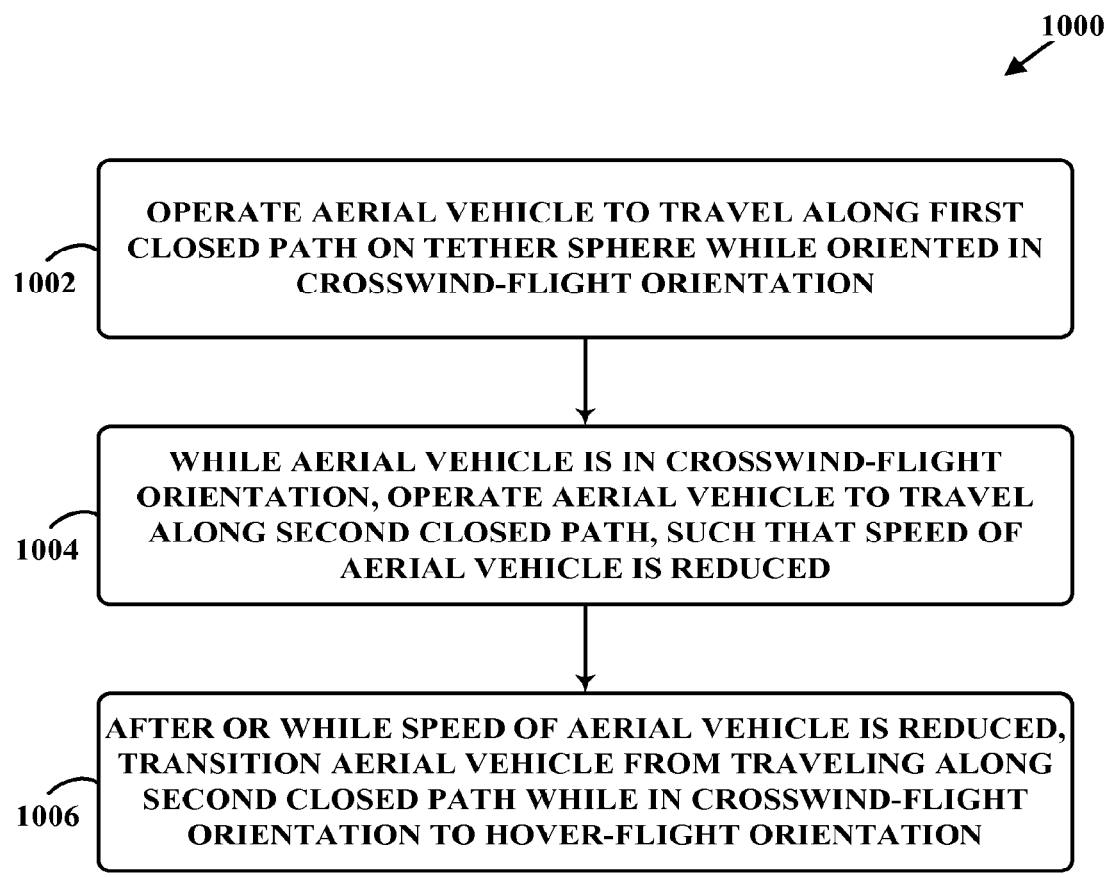
FIG. 10 is a flowchart of a method, according to an example embodiment.

FIG. 10 is a flowchart illustrating a method 1000, according to an example embodiment. The method 1000 may be used in transitioning an aerial vehicle from crosswind flight to hover flight. Illustrative methods, such as method 1000, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 1000 may be performed by the control system 248. For simplicity, method 1000 may be described generally as being carried out by an aerial vehicle, such as the aerial vehicle 130 and/or the aerial vehicle 230. However, it should be understood that example methods, such as method 1000, may be carried out by other entities or combinations of entities without departing from the scope of the disclosure.

As shown by block 1002, method 1000 may involve operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether. At block 1002, the aerial vehicle may be operated the same or similar way as the aerial vehicle 130 may be operated at point 408 in example 400 as described with reference to FIG. 4, at point 508 in example 500 as described with reference to FIG. 5, and/or at point 608 as described with reference to FIG. 6.

As shown by block 1004, method 1000 may involve while the aerial vehicle is in the crosswind-flight orientation, operating the aerial vehicle to travel along a second closed path on the tether sphere, such that a speed of the aerial vehicle is reduced. At block 1004, the aerial vehicle may be operated the same or similar way as the aerial vehicle 130 may be operated at point 410 in example 400 as described with reference to FIG. 4, at point 510 in example 500 as described with reference to FIG. 5, and/or at point 608 as described with reference to FIG. 6.

For instance, in some embodiments, a first axis may intersect the first closed path and a second axis may intersect the second closed path, and the first axis may be substantially downwind of the ground station, and the second axis may be less downwind from the ground station. Further, in at least some such embodiments, the second axis may be located to the left of the first axis. Further still, in at least some such embodiments, the second axis may be located to the right of the first axis.

Moreover, in some embodiments, a point on the second closed path may be located at an angle away from substantially downwind of the ground station. Further, in some embodiments, a point on the second closed path may be located at an altitude that is less than an altitude of a corresponding point on the first closed path. Further still, in some embodiments, the second closed path may have a shape that is different than a shape of the first closed path.

In addition, in some embodiments, operating the aerial vehicle to travel along the second closed path may involve operating the aerial vehicle to travel along a first portion of the second closed path, wherein the first portion of the second closed path is at a substantially constant elevation, and operating the aerial vehicle to travel along a second portion of the second closed path, wherein the second portion of the second closed path is at a substantially constant azimuth. And in some such embodiments, the second portion of the second closed path may be substantially on or substantially parallel to an axis that is substantially downwind of the ground station.

As shown by block 1006, method 1000 may involve after or while the speed of the aerial vehicle is reduced, transitioning the aerial vehicle from traveling along the second closed path while in the crosswind-flight orientation to a hover-flight orientation. At block 1006, the aerial vehicle may be operated the same or similar way as the aerial vehicle 130 may be operated at point 412 in example 400 as described with reference to FIG. 4, at point 512 in example 500 as described with reference to FIG. 5, and/or at point 612 as described with reference to FIG. 6.

For instance, in some embodiments, transitioning the aerial vehicle from traveling along the second closed path while in the crosswind-flight orientation to the hover-flight orientation may involve transitioning the aerial vehicle from traveling along the second closed path while in the crosswind-flight orientation to the hover-flight orientation at a threshold speed. Further, in at least one such embodiment, the threshold speed may vary based on a location of the aerial vehicle along the second closed path.

Moreover, in some embodiments, operating the aerial vehicle to travel along the second closed path may involve operating the aerial vehicle in an upstroke and a down stroke, and wherein transitioning the aerial vehicle from traveling along the second closed path while in the crosswind-flight orientation to the hover-flight orientation may involve transitioning the aerial vehicle from traveling along the second closed path while in the crosswind-flight orientation to the hover-flight orientation during the upstroke.

In addition, method 1000 may be carried out without information provided by one or more sensors. As examples, the one or more sensors may include at least one of a load cell or a pitot tube.

Moreover, method 1000 may further involve after or while the speed of the aerial vehicle is reduced, while the aerial vehicle is in the crosswind-flight orientation, operating the aerial vehicle to travel along a third closed path on the tether sphere, such that a speed of the aerial vehicle is further reduced.

The aerial vehicle may be operated to travel along a third closed path on the tether sphere, such that a speed of the aerial vehicle is further reduced the same or similar way as the aerial vehicle 130 may be operated at point 410 in example 400 as described with reference to FIG. 4, at point 510 in example 500 as described with reference to FIG. 5, and/or at point 608 in example 600 as described with reference to FIG. 6.

The third closed path may take the form of or be similar in form to any of second closed paths described herein. For instance, in some embodiments, when the second closed path takes the form of or is similar in form to the second closed path 450B, the third closed path may take the form of or be similar in form to the second closed path 550B and/or the second closed path 650B. Similarly, when the second closed path takes the form of or is similar in form to the second closed path 550B, the third closed path may take the form of or be similar in form to the second closed path 450B and/or the second closed path 650B. Similarly, when the second closed path takes the form of or is similar in form to the second closed path 650B, the third closed path may take the form of or be similar in form to the second closed path 450B and/or the second closed path 550B.

In some examples, the aerial vehicle may be operated to travel along the third closed path on the tether sphere after the aerial vehicle may be operated to travel along the second closed path on the tether sphere. And, in some implementations, method 1000 may further involve after or while the speed is further reduced, transitioning the aerial vehicle from traveling along the third closed path while in the crosswind-flight orientation to a hover-flight orientation.

The aerial vehicle may be transitioned from traveling along the third closed path while in the crosswind-flight orientation to a hover-flight orientation the same or similar way as the aerial vehicle 130 may be operated at point 412 in example 400 as described with reference to FIG. 4, at point 512 in example 500 as described with reference to FIG. 5, and/or at point 612 as described with reference to FIG. 6.

Figure 11:
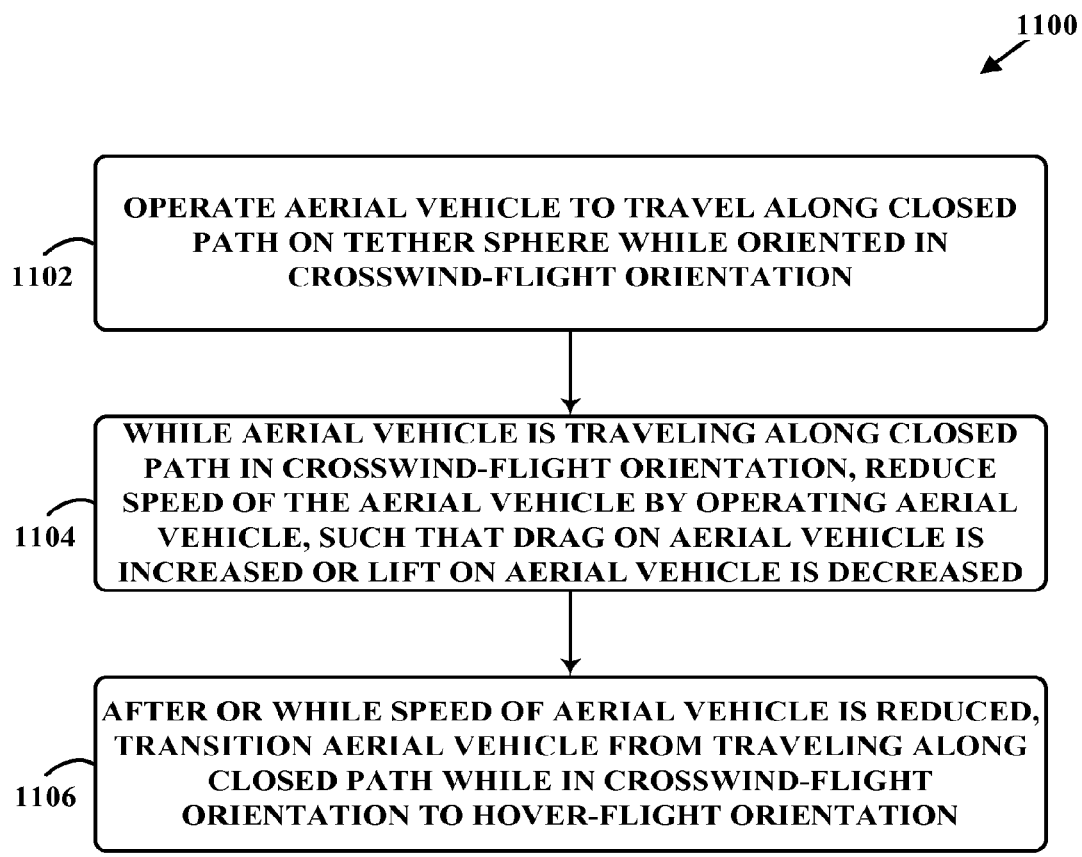
FIG. 11 is a flowchart of another method, according to an example embodiment.

FIG. 11 is a flowchart illustrating a method 1100, according to an example embodiment. The method 1100 may be used in transitioning an aerial vehicle from crosswind flight to hover flight. Illustrative methods, such as method 1100, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 1100 may be performed by the control system 248. For simplicity, method 1100 may be described generally as being carried out by an aerial vehicle, such as the aerial vehicle 130 and/or the aerial vehicle 230. However, it should be understood that example methods, such as method 1100, may be carried out by other entities or combinations of entities without departing from the scope of the disclosure.

As shown by block 1102, method 1100 may involve operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether. At block 1102, the aerial vehicle may be operated the same or similar way as the aerial vehicle 130 may be operated at point 808 in example 800 as described with reference to FIG. 8.

As shown by block 1104, method 1100 may involve while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased. At block 1104, the aerial vehicle may be operated the same or similar way as the aerial vehicle 130 may be operated at point 810 in example 800 as described with reference to FIG. 8.

For instance, in some embodiments, the aerial vehicle may include a main wing, and reducing the speed of the aerial vehicle by operating the aerial vehicle such that a drag on the aerial vehicle is increased or a lift on the aerial vehicle is decreased may involve increasing an angle of attack of the aerial vehicle, such that at least a portion of the main wing stalls. Moreover, in some embodiments, the aerial vehicle may include a main wing having one or more control surfaces, and reducing the speed of the aerial vehicle by operating the aerial vehicle such that a drag on the aerial vehicle is increased or a lift on the aerial vehicle is decreased may involve operating the one or more control surfaces to increase the drag on the aerial vehicle.

Further, in some embodiments, the aerial vehicle may include one or more rotors, and reducing the speed of the aerial vehicle by operating the aerial vehicle such that a drag on the aerial vehicle is increased or a lift on the aerial vehicle is decreased may involve operating the one or more rotors to increase the drag on the aerial vehicle. Further still, in some embodiments, the aerial vehicle may include one or more rotor connectors, and reducing the speed of the aerial vehicle by operating the aerial vehicle such that a drag on the aerial vehicle is increased or a lift on the aerial vehicle is decreased may involve increasing a side slip angle of the aerial vehicle, such that the one or more rotor connectors stalls.

Moreover, in some embodiments, the aerial vehicle may include a main wing having one or more control surfaces, and reducing the speed of the aerial vehicle by operating the aerial vehicle such that a drag on the aerial vehicle is increased or a lift on the aerial vehicle is decreased may involve operating the one or more control surfaces to decrease the lift on the aerial vehicle. Further, in some embodiments, the aerial vehicle may include a main wing having one or more control surfaces, and reducing the speed of the aerial vehicle by operating the aerial vehicle such that a drag on the aerial vehicle is increased or a lift on the aerial vehicle is decreased may involve decreasing an angle of attack of the aerial vehicle by adjusting the one or more control surfaces. Further still, in some embodiments, the aerial vehicle may include a main wing, and reducing the speed on the aerial vehicle by operating the aerial vehicle such that a drag on the aerial vehicle is increased or a lift on the aerial vehicle is decreased may involve stalling at least a portion of the main wing.

In addition, in some embodiments, reducing a speed of the aerial vehicle by operating the aerial vehicle such that a drag on the aerial vehicle is increased or a lift on the aerial vehicle is decreased may involve operating the aerial vehicle such that the aerial vehicle is in a static force balance.

As shown by block 1106, method 1100 may involve after or while the speed of the aerial vehicle is reduced, transitioning the aerial vehicle from traveling along the closed path while in the crosswind-flight orientation to a hover-flight orientation. At block 1106, the aerial vehicle may be operated the same or similar way as the aerial vehicle 130 may be operated at point 812 as described with reference to FIG. 6.

For instance, in some embodiments, transitioning the aerial vehicle from traveling along the closed path while in the crosswind-flight orientation to the hover-flight orientation may involve transitioning the aerial vehicle from traveling along the closed path while in the crosswind-flight orientation to the hover-flight orientation at a threshold speed. Further, in at least one such embodiment, the threshold speed may vary based on a location of the aerial vehicle along the closed path.

Moreover, in some embodiments, operating the aerial vehicle to travel along the closed path may involve operating the aerial vehicle in an upstroke and a down stroke, and wherein transitioning the aerial vehicle from traveling along the closed path while in the crosswind-flight orientation to the hover-flight orientation may involve transitioning the aerial vehicle from traveling along the closed path while in the crosswind-flight orientation to the hover-flight orientation during the upstroke.

In addition, method 1100 may be carried out without information provided by one or more sensors. As examples, the one or more sensors may include at least one of a load cell or a pitot tube.

Figure 12:
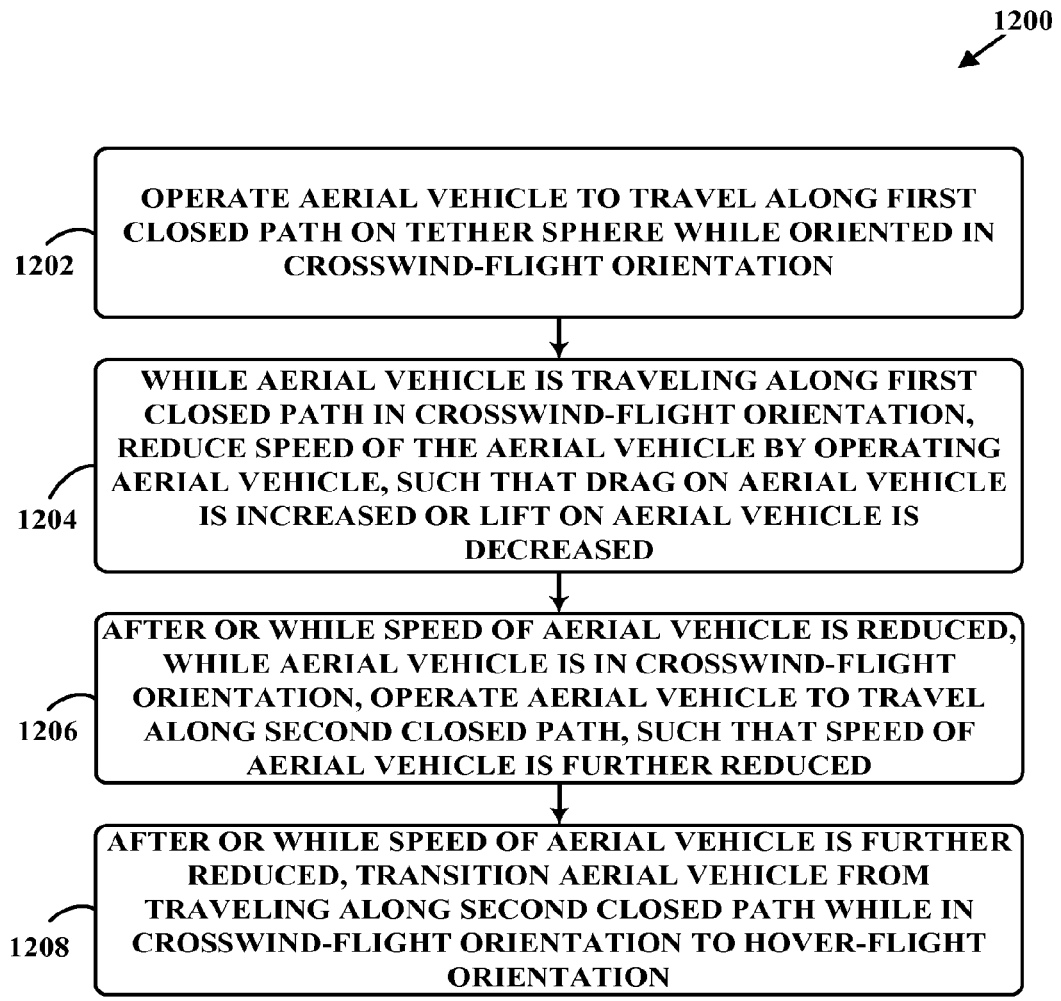
FIG. 12 is a flowchart of yet another method, according to an example embodiment.

FIG. 12 is a flowchart illustrating a method 1200, according to an example embodiment. The method 1200 may be used in transitioning an aerial vehicle from crosswind flight to hover flight. Illustrative methods, such as method 1200, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 1200 may be performed by the control system 248. For simplicity, method 1200 may be described generally as being carried out by an aerial vehicle, such as the aerial vehicle 130 and/or the aerial vehicle 230. However, it should be understood that example methods, such as method 1200, may be carried out by other entities or combinations of entities without departing from the scope of the disclosure.

As shown by block 1202, method 1200 may involve operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether. Block 1202 may be performed the same or similar way as block 1002 of method 1000 may be performed.

As shown by block 1204, method 1200 may involve while the aerial vehicle is traveling along the first closed path in the crosswind-flight orientation, reducing a speed of the aerial vehicle by operating the aerial vehicle such that a drag on the aerial vehicle is increased or a lift on the aerial vehicle is decreased. Block 1204 may be performed the same or similar way as block 1104 of method 1100 may be performed.

As shown by block 1206, method 1200 may involve after or while the speed of the aerial vehicle is reduced, while the aerial vehicle is in the crosswind-flight orientation, operating the aerial vehicle to travel along a second closed path, such that a speed of the aerial vehicle is further reduced. Block 1206 may be performed the same or similar way as block 1004 of method 1000 may be performed.

As shown by block 1208, method 1200 may involve after or while the speed of the aerial vehicle is further reduced, transitioning the aerial vehicle from traveling along the second closed path while in the crosswind-flight orientation to a hover-flight orientation. Block 1208 may be performed the same or similar way as block 1006 may be performed.

Further, method 1200 may further involve after or while the speed of the aerial vehicle is further reduced, while the aerial vehicle is traveling along the second closed path in the crosswind-flight orientation, further reducing the speed of the aerial vehicle by operating the aerial vehicle such that a drag on the aerial vehicle is increased or a lift on the aerial vehicle is decreased. The aerial vehicle may be operated such that a drag on the aerial vehicle is increased or a lift on the aerial vehicle is decreased the same or similar way as the aerial vehicle may be operated at point 810 in example 800 as described with reference to FIG. 8.

In some examples, the aerial vehicle may further reduce the speed of the aerial vehicle by operating the aerial vehicle, such that a drag on the aerial vehicle is increased or a lift on the aerial vehicle is decreased after the aerial vehicle may be operated to travel along the second closed path on the tether sphere. And, in some implementations, method 1200 may further involve after or while the speed is further reduced, transitioning the aerial vehicle from traveling along the second closed path in the crosswind-flight orientation to the hover-flight orientation.

VI. Illustrative Non-Transitory Computer Readable Media

Some or all of the functions described above and illustrated in FIGS. 10-12 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be the control system 248 as described and illustrated in reference to FIG. 2. Additionally or alternatively, the computing device could include another computing device, such as a server in a server network.

The non-transitory computer readable medium may store instructions executable by a processor (e.g. processor 242 and/or processor 212 as described in reference to FIG. 2) to perform various functions. The functions may include operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is in the crosswind-flight orientation, operating the aerial vehicle to travel along a second closed path on the tether sphere, such that a speed of the aerial vehicle is reduced; and after or while the speed of the aerial vehicle is reduced, transitioning the aerial vehicle from traveling along the second closed path while in the crosswind-flight orientation to a hover-flight orientation.

In addition, the functions may include operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether; while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and after or while the speed of the aerial vehicle is reduced, transitioning the aerial vehicle from traveling along the closed path while in the crosswind-flight orientation to a hover-flight orientation.

VII. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A non-transitory computer readable medium having stored therein instructions executable by a computing device to cause the computing device to perform functions, the functions comprising:
   operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether;
   while the aerial vehicle is in the crosswind-flight orientation, operating the aerial vehicle to travel along a second closed path on the tether sphere, such that a speed of the aerial vehicle is reduced; and
   transitioning the aerial vehicle from traveling along the second closed path while in the crosswind-flight orientation to a hover-flight orientation.

2. The non-transitory computer readable medium of claim 1, wherein a first axis intersects the first closed path and a second axis intersects the second closed path, wherein the first axis is substantially downwind of the ground station, and wherein the second axis is less downwind from the ground station.

3. The non-transitory computer readable medium of claim 2, wherein, facing downwind, the second axis is located to a left side of the first axis.

4. The non-transitory computer readable medium of claim 2, wherein, facing downwind, the second axis is located to a right side of the first axis.

5. The non-transitory computer readable medium of claim 1, wherein a point on the second closed path is located at an angle from substantially downwind of the ground station.

6. The non-transitory computer readable medium of claim 1, wherein a point on the second closed path is located at a first altitude that is less than a second altitude of a corresponding point on the first closed path.

7. The non-transitory computer readable medium of claim 1, wherein the second closed path has a shape that is different than a shape of the first closed path.

8. The non-transitory computer readable medium of claim 1, wherein operating the aerial vehicle to travel along the second closed path comprises:
   operating the aerial vehicle to travel along a first portion of the second closed path, wherein the first portion of the second closed path is at a substantially constant elevation; and
   operating the aerial vehicle to travel along a second portion of the second closed path, wherein the second portion of the second closed path is at a substantially constant azimuth.

9. The non-transitory computer readable medium of claim 1, wherein operating the aerial vehicle to travel along the second closed path comprises operating the aerial vehicle in an upstroke and a down stroke, and wherein transitioning the aerial vehicle from traveling along the second closed path while in the crosswind-flight orientation to the hover-flight orientation comprises transitioning the aerial vehicle from traveling along the second closed path while in the crosswind-flight orientation to the hover-flight orientation during the upstroke.

10. The non-transitory computer readable medium of claim 1, wherein transitioning the aerial vehicle from traveling along the second closed path while in the crosswind-flight orientation to the hover-flight orientation comprises transitioning the aerial vehicle from traveling along the second closed path while in the crosswind-flight orientation to the hover-flight orientation at a threshold speed.

11. The non-transitory computer readable medium of claim 10, wherein the threshold speed varies based on a location of the aerial vehicle along the second closed path.

12. The non-transitory computer readable medium of claim 1, wherein operating the aerial vehicle to travel along the first closed path comprises operating the aerial vehicle to travel along the first closed path without information provided by one or more sensors, wherein while the aerial vehicle is in the crosswind-flight orientation, operating the aerial vehicle to travel along the second closed path comprises operating the aerial vehicle to travel along the second closed path without information provided by the one or more sensors, and
wherein transitioning the aerial vehicle from traveling along the second closed path while in the crosswind-flight orientation to the hover-flight orientation comprises transitioning the aerial vehicle from traveling along the second closed path while in the crosswind-flight orientation to the hover-flight orientation without information provided by the one or more sensors.

13. The non-transitory computer readable medium of claim 12, wherein the one or more sensors comprise at least one of a load cell or a pitot tube.

14. A system comprising:
an aerial vehicle connected to a first end of a tether;
a ground station connected to a second end of the tether; and
a control system programmed to:
operate the aerial vehicle to travel along a closed path on a tether sphere while oriented in a crosswind-flight orientation, wherein the tether sphere has a radius corresponding to a length of the tether;
while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and
after the speed of the aerial vehicle is reduced, transitioning the aerial vehicle from traveling along the closed path while in the crosswind-flight orientation to a hover-flight orientation.

15. The system of claim 14, wherein the aerial vehicle comprises a main wing, and wherein reducing the speed of the aerial vehicle by operating the aerial vehicle such that a drag on the aerial vehicle is increased or a lift on the aerial vehicle is decreased comprises increasing an angle of attack of the aerial vehicle such that at least a portion of the main wing stalls.

16. The system of claim 14, wherein the aerial vehicle comprises a main wing having one or more control surfaces, and wherein reducing the speed of the aerial vehicle by operating the aerial vehicle such that a drag on the aerial vehicle is increased or a lift on the aerial vehicle is decreased comprises operating the one or more control surfaces to increase the drag on the aerial vehicle.

17. The system of claim 14, wherein the aerial vehicle comprises one or more rotors, and wherein reducing the speed of the aerial vehicle by operating the aerial vehicle such that a drag on the aerial vehicle is increased or a lift on the aerial vehicle is decreased comprises operating the one or more rotors to increase the drag on the aerial vehicle.

18. The system of claim 14, wherein reducing the speed of the aerial vehicle by operating the aerial vehicle such that a drag on the aerial vehicle is increased or a lift on the aerial vehicle is decreased comprises operating the aerial vehicle such that the aerial vehicle is in a static force balance.

19. A non-transitory computer readable medium having stored therein instructions executable by a computing device to cause the computing device to perform functions, the functions comprising:
operating an aerial vehicle to travel along a closed path on a tether sphere while oriented in a crosswind-flight orientation, wherein a tether is connected to the aerial vehicle on a first end and is connected to a ground station on a second end, and wherein the tether sphere has a radius corresponding to a length of the tether;
while the aerial vehicle is traveling along the closed path in the crosswind-flight orientation, reducing a speed of the aerial vehicle by operating the aerial vehicle such that a drag on the aerial vehicle is increased or a lift on the aerial vehicle is decreased; and
after the speed of the aerial vehicle is reduced, transitioning the aerial vehicle from traveling along the closed path while in the crosswind-flight orientation to a hover-flight orientation.

20. The non-transitory computer readable medium of claim 19, wherein the aerial vehicle comprises a main wing, and wherein reducing the speed of the aerial vehicle by operating the aerial vehicle such that a drag on the aerial vehicle is increased or a lift on the aerial vehicle is decreased comprises increasing an angle of attack of the aerial vehicle such that at least a portion of the main wing stalls.

21. A method comprising:
operating an aerial vehicle to travel along a first closed path on a tether sphere while oriented in a crosswind-flight orientation, wherein a tether is connected to the aerial vehicle on a first end and is connected to a ground station on a second end, and wherein the tether sphere has a radius corresponding to a length of the tether;
while the aerial vehicle is traveling along the first closed path in the crosswind-flight orientation, reducing a speed of the aerial vehicle by operating the aerial vehicle such that a drag on the aerial vehicle is increased or a lift on the aerial vehicle is decreased;
after the speed of the aerial is reduced, while the aerial vehicle is in the crosswind-flight orientation, operating the aerial vehicle to travel along a second closed path, such that a speed of the aerial vehicle is further reduced; and
transitioning the aerial vehicle from traveling along the second closed path while in the crosswind-flight orientation to a hover-flight orientation.

* * * * *